(12) United States Patent
Kono

(10) Patent No.: US 10,928,249 B2
(45) Date of Patent: *Feb. 23, 2021

(54) SPECTROSCOPIC MEASUREMENT DEVICE AND SPECTROMETRY SYSTEM

(71) Applicant: HAMAMATSU PHOTONICS K.K., Hamamatsu (JP)

(72) Inventor: Makoto Kono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/347,259

(22) PCT Filed: Nov. 13, 2017

(86) PCT No.: PCT/JP2017/040762
§ 371 (c)(1),
(2) Date: May 3, 2019

(87) PCT Pub. No.: WO2018/088555
PCT Pub. Date: May 17, 2018

(65) Prior Publication Data
US 2019/0277696 A1    Sep. 12, 2019

(30) Foreign Application Priority Data
Nov. 14, 2016  (JP) .............................. JP2013-221597

(51) Int. Cl.
*G01J 3/02* (2006.01)
*G01J 3/42* (2006.01)
(Continued)

(52) U.S. Cl.
CPC .............. *G01J 3/42* (2013.01); *G01J 3/0256* (2013.01); *G01J 3/0262* (2013.01); *G01N 21/01* (2013.01); *G01N 21/27* (2013.01)

(58) Field of Classification Search
CPC ........ G01J 3/02; G01J 3/00; G01J 3/26; G01J 3/28; G01J 3/42; G01N 21/27; G01N 21/01

See application file for complete search history.

(56) References Cited

U.S. PATENT DOCUMENTS 4,930,865 A    6/1990  Dosmann
5,092,342 A    3/1992  Hattendorff et al.
(Continued)

FOREIGN PATENT DOCUMENTS

CN    204301859 U    4/2015
CN    204495371 U    7/2015
(Continued)

OTHER PUBLICATIONS

International Preliminary Report on Patentability dated May 23, 2019 for PCT/JP2017/040762.

*Primary Examiner* — Abdullahi Nur
(74) *Attorney, Agent, or Firm* — Faegre Drinker Biddle & Reath LLP

(57) ABSTRACT

A spectroscopic measurement device emits light to a measurement target and measures the measurement light output from the measurement target in accordance with the light emission. A spectroscopic measurement device includes: a first housing having a light shielding property and configured to house a light source that emits light and having a first opening through which the light emitted from the light source passes; a second housing having a light shielding property and having a second opening through which the measurement light passes and configured to house a spectrometer that receives the measurement light that has passed through the second opening; and an attachment configured to detachably hold the first housing and the second housing.

15 Claims, 19 Drawing Sheets

(51) Int. Cl.
*G01N 21/01* (2006.01)
*G01N 21/27* (2006.01)

(56) References Cited

U.S. PATENT DOCUMENTS

| | | | | |
|---|---|---|---|---|
| 2009/0201491 | A1* | 8/2009 | Busch | G01J 3/02 |
| | | | | 356/51 |
| 2012/0273681 | A1* | 11/2012 | Schulkin | G01J 3/0291 |
| | | | | 250/339.06 |
| 2014/0092383 | A1* | 4/2014 | Gunji | G01J 3/0291 |
| | | | | 356/300 |
| 2015/0160248 | A1* | 6/2015 | Gussakovsky | G01N 35/00732 |
| | | | | 356/326 |
| 2015/0189714 | A1* | 7/2015 | Fathalla | H05B 45/10 |
| | | | | 315/134 |

FOREIGN PATENT DOCUMENTS

| | | |
|---|---|---|
| EP | 2487480 | 8/2012 |
| JP | S54-110886 A | 8/1979 |
| JP | H03-25348 A | 2/1991 |
| JP | H07-198597 A | 8/1995 |
| JP | 2003-510560 A | 3/2003 |
| JP | 3446120 B2 | 9/2003 |
| JP | 2014-102217 A | 6/2014 |
| JP | 2015-028466 A | 2/2015 |
| JP | 2016-052881 A | 4/2016 |
| WO | WO-01/06232 A2 | 1/2001 |
| WO | WO 2005/015187 A1 | 2/2005 |
| WO | WO 2012/157190 A1 | 11/2012 |

* cited by examiner

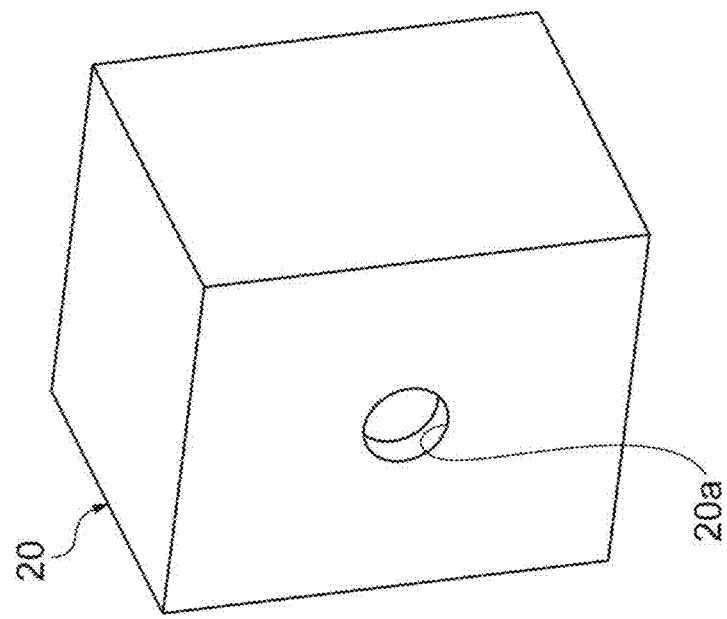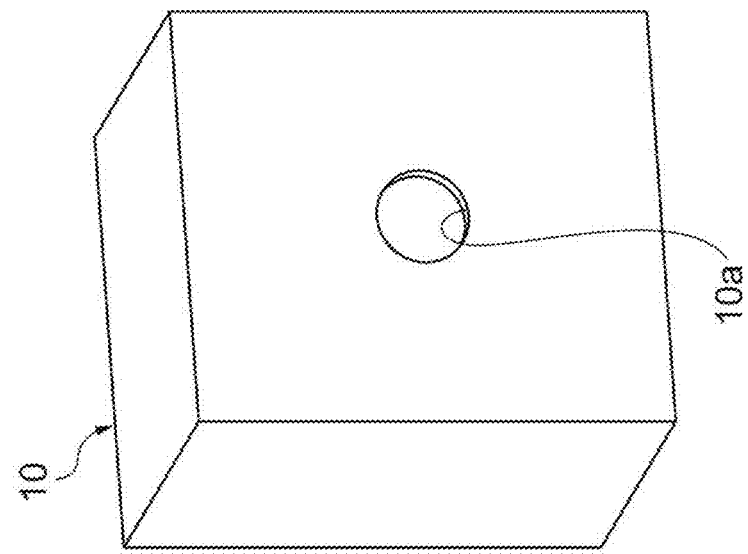
Fig.5

SPECTROSCOPIC MEASUREMENT DEVICE AND SPECTROMETRY SYSTEM

TECHNICAL FIELD

One aspect of the present invention relates to a spectroscopic measurement device and a spectrometry system.

BACKGROUND ART

An apparatus described in Patent Literature 1 is known as an example of a conventional spectroscopic measurement device. The apparatus described in Patent Literature 1 uses a light source lamp (light source) to emit light onto a specimen (measurement target) mounted on a specimen table, and detects the light (measurement light) output from the specimen corresponding to the light emission by using an integrating sphere and a photodetector (spectrometer), so as to measure optical properties of the specimen.

CITATION LIST

Patent Literatures

Patent Literature 1: Japanese Patent No. 3446120

SUMMARY OF INVENTION

Technical Problem

Meanwhile, relative positions at which the light source and the spectrometer should be disposed are different between the case of measuring transmitted light, that is, light transmitted through the measurement target, and the case of measuring reflected light, that is, light reflected by the measurement target. Accordingly, the spectroscopic measurement device described above includes: a motor-rotatable first rotating member constituting an optical path of the light emitted onto the measurement target; and a motor-rotatable second rotating member constituting an optical path of the measurement light output from the measurement target, in order to arrange the light source and the spectrometer at desired relative positions. This, however, would complicate the configuration and enlarge the apparatus. In an attempt, in particular, to shield external light that is likely to greatly influence the measurement of the optical properties of the measurement target, for example, it would be necessary to dispose the whole device in a housing having a light shielding property, and this would further enlarge the device.

In view of the above, one aspect of the present invention is to provide a spectroscopic measurement device capable of disposing a light source and a spectrometer at desired relative positions and downsizing the device, and provide a spectrometry system including the spectroscopic measurement device.

Solution to Problem

A spectroscopic measurement device according to one aspect of the present invention is a spectroscopic measurement device configured to emit light onto a measurement target to measure measurement light output from the measurement target corresponding to the light emission, the device including: a first housing having a light shielding property and configured to house a light source that emits light and having a first opening through which the light emitted from the light source passes; a second housing having a light shielding property and having a second opening through which the measurement light passes and configured to house a spectrometer that receives the measurement light that has passed through the second opening; and an attachment configured to detachably hold the first housing and the second housing.

The spectroscopic measurement device attaches the first housing and the second housing to the attachment. This enables the first housing and the second housing to be held in a desired positional relationship corresponding to the attachment, and consequently enables the light source housed in the first housing and the spectrometer housed in the second housing to be disposed at desired relative positions with a simple configuration. Additionally, the first housing and the second housing have a light shielding property, and thus, can shield external light without a need to provide a separate configuration. Accordingly, it is possible to arrange the light source and the spectrometer at desired relative positions and downsize the apparatus.

In the spectroscopic measurement device according to one aspect of the present invention, the attachment may have a light shielding property, and may internally include: a first optical path being an optical path of the light emitted onto the measurement target and is continuous with the first opening; and a second optical path being an optical path of the measurement light output from the measurement target and is continuous with the second opening. This configuration would suppress invasion of external light into the first optical path and the second optical path provided inside the attachment.

In the spectroscopic measurement device according to one aspect of the present invention, the attachment may hold the first housing and the second housing so that the first opening and the second opening face each other. In this case, the transmitted light, that is, light transmitted through the measurement target, can be received by the spectrometer as measurement light.

In the spectroscopic measurement device according to one aspect of the present invention, the attachment may slidably hold one of the first housing and the second housing to the other in a direction to allow the first opening and the second opening to come closer to or away from each other. In this case, the measurement target can be firmly sandwiched and held by the first housing and the second housing regardless of the thickness of the measurement target.

In the spectroscopic measurement device according to one aspect of the present invention, the attachment may be configured to hold the first housing and the second housing so that an optical axis of the light to be emitted onto the measurement target and an optical axis of the measurement light output from the measurement target intersect at a predetermined angle. In this case, reflected light reflected by the measurement target can be received by the spectrometer as measurement light.

In the spectroscopic measurement device according to one aspect of the present invention, the attachment may have a position regulator to regulate a position of the measurement target or a position of a container accommodating the measurement target. In this case, it is possible to hold the measurement target or the container accommodating the measurement target by the position regulator.

A spectrometry system according to one aspect of the present invention includes: the above-described spectroscopic measurement device; a measurement result transmission unit provided in the spectroscopic measurement device and configured to transmit a measurement result of the spectrometer; and a measurement result processing device configured to receive the measurement result of the spectrometer from the measurement result transmission unit directly or through a network and perform processing of the measurement result.

Since this spectrometry system includes the above-described spectroscopic measurement device, it is possible to obtain the above effect of enabling the light source and the spectrometer to be disposed at desired relative positions and enabling downsizing of the device. Furthermore, it is possible to have a configuration in which the spectroscopic measurement device has no measurement result processing function, leading to downsizing of the spectroscopic measurement device.

The spectrometry system according to one aspect of the present invention further includes: a control terminal configured to generate a control signal for controlling the light source in accordance with operation of an operator and transmit the control signal; a control signal reception unit provided in the spectroscopic measurement device and configured to receive the control signal from the control terminal directly or through a network; and a light source control unit provided in the spectroscopic measurement device and configured to control the light source on the basis of the control signal received by the control signal reception unit. With this configuration, it is possible to remotely operate the light source.

Advantageous Effects of Invention

According to one aspect of the present invention, it is possible to provide a spectroscopic measurement device capable of disposing the light source and the spectrometer at desired relative positions and downsizing the device, and a spectrometry system including the spectroscopic measurement device.

BRIEF DESCRIPTION OF DRAWINGS

FIG. 5 is a perspective view illustrating a first housing and a second housing of the spectroscopic measurement device of FIG. 2.

DESCRIPTION OF EMBODIMENTS

Figure 1:
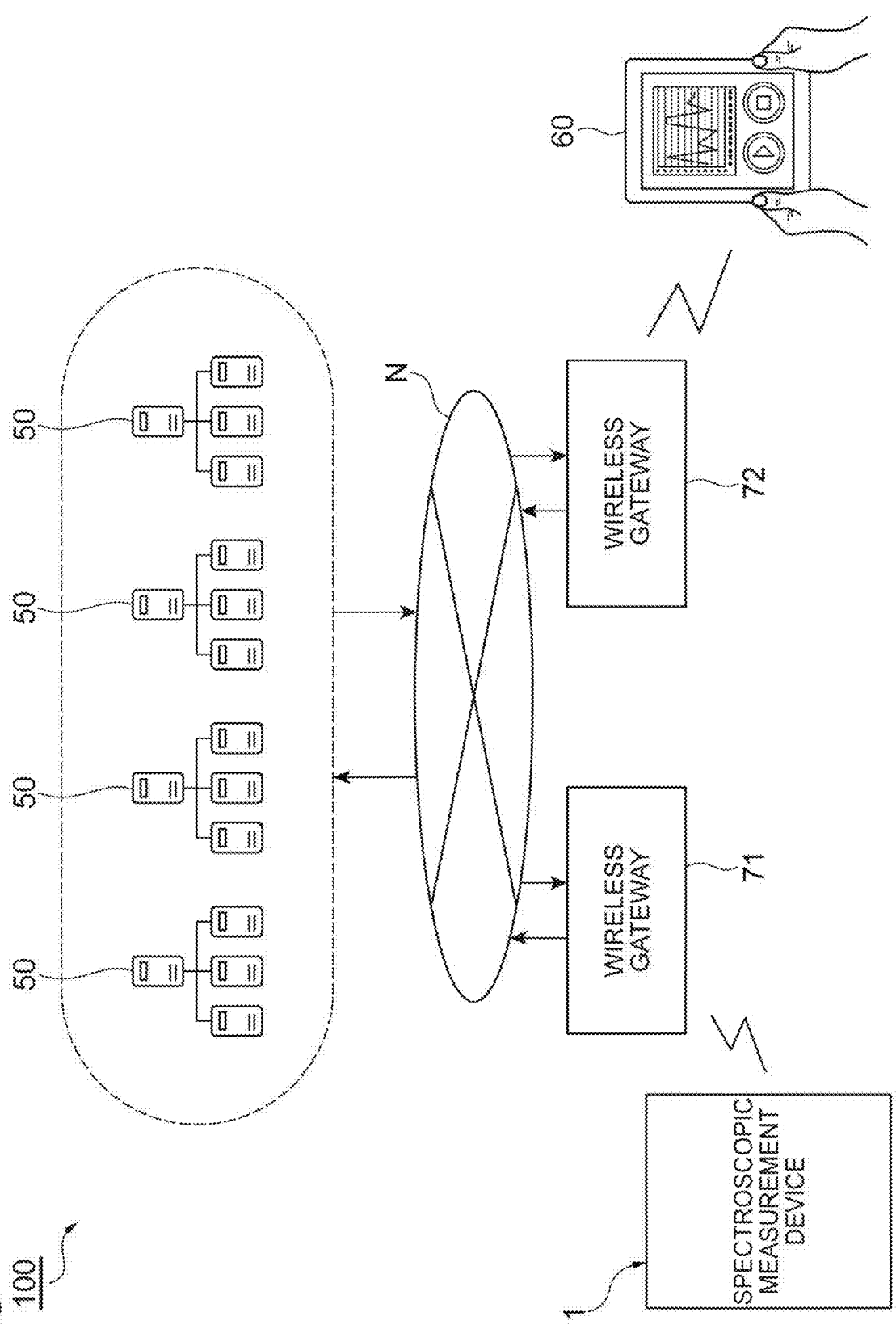
FIG. 1 is a configuration diagram illustrating a spectrometry system according to a first embodiment.

Hereinafter, one embodiment of the present invention will be described in detail with reference to the accompanying drawings. In the following, the same or equivalent elements are denoted by the same reference numerals, and duplicate explanation is omitted.

First Embodiment

As illustrated in FIG. 1, a spectrometry system 100 according to a first embodiment includes: a spectroscopic measurement device 1; a data processing server 50; and a mobile information terminal 60. The spectrometry system 100 has a configuration in which the spectroscopic measurement device 1, the data processing server 50, and the mobile information terminal 60 can perform data communication with each other via a network N.

First, a configuration of the spectroscopic measurement device 1 will be described. As illustrated in FIGS. 2 to 6, the spectroscopic measurement device 1 is a mobile-type (portable-type) measurement device that emits light to a measurement target S and measures measurement light output from the measurement target S corresponding to the light emission. The spectroscopic measurement device 1 according to the present embodiment, in particular, can perform transmitted light measurement using transmitted light, that is, light transmitted through the measurement target 5, as measurement light. The spectroscopic measurement device 1 includes a first housing 10, a second housing 20, and an attachment 30.

Figure 3:
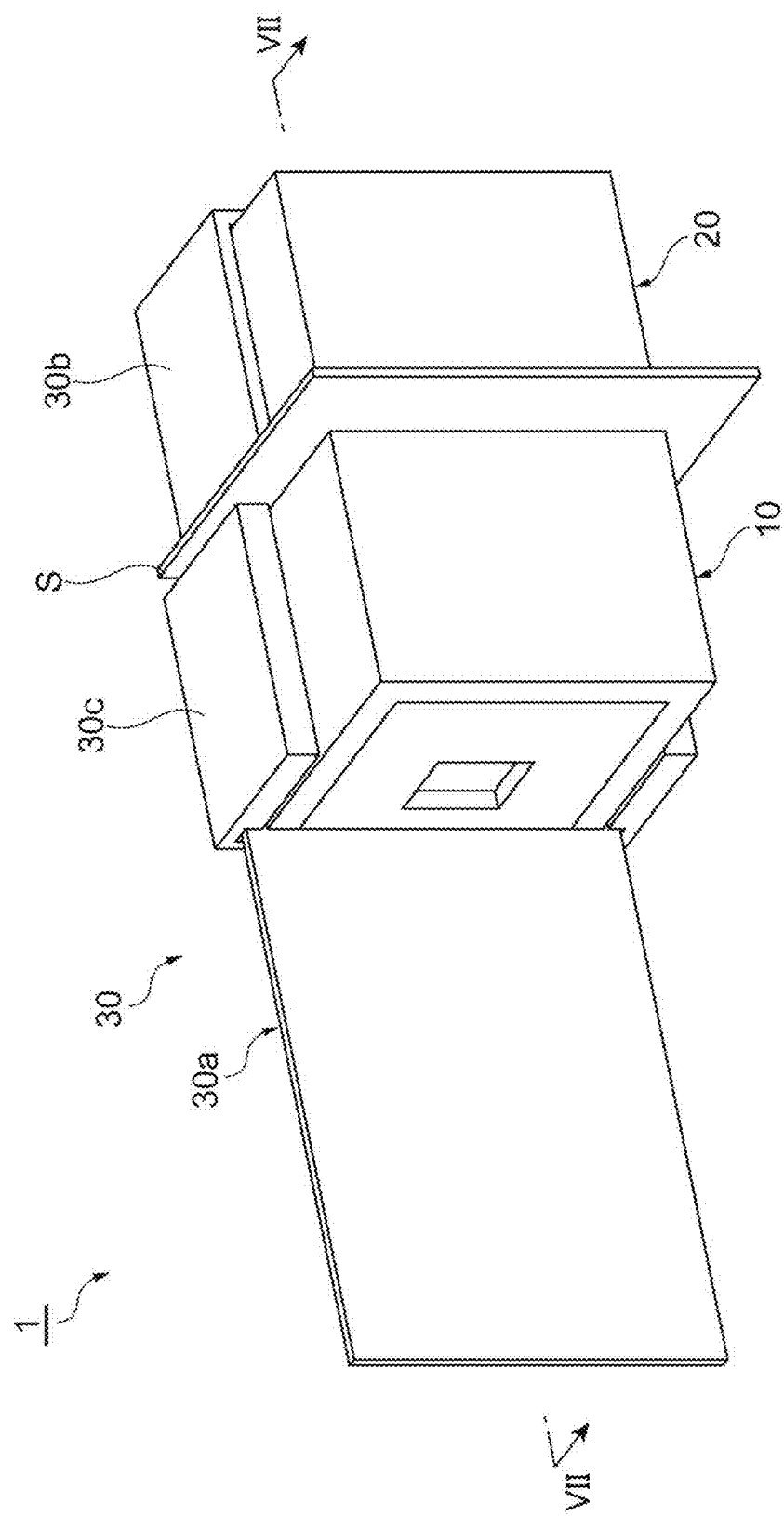
FIG. 3 is a perspective view illustrating a state of measuring the measurement light in the spectroscopic measurement device of FIG. 2.
Figure 4:
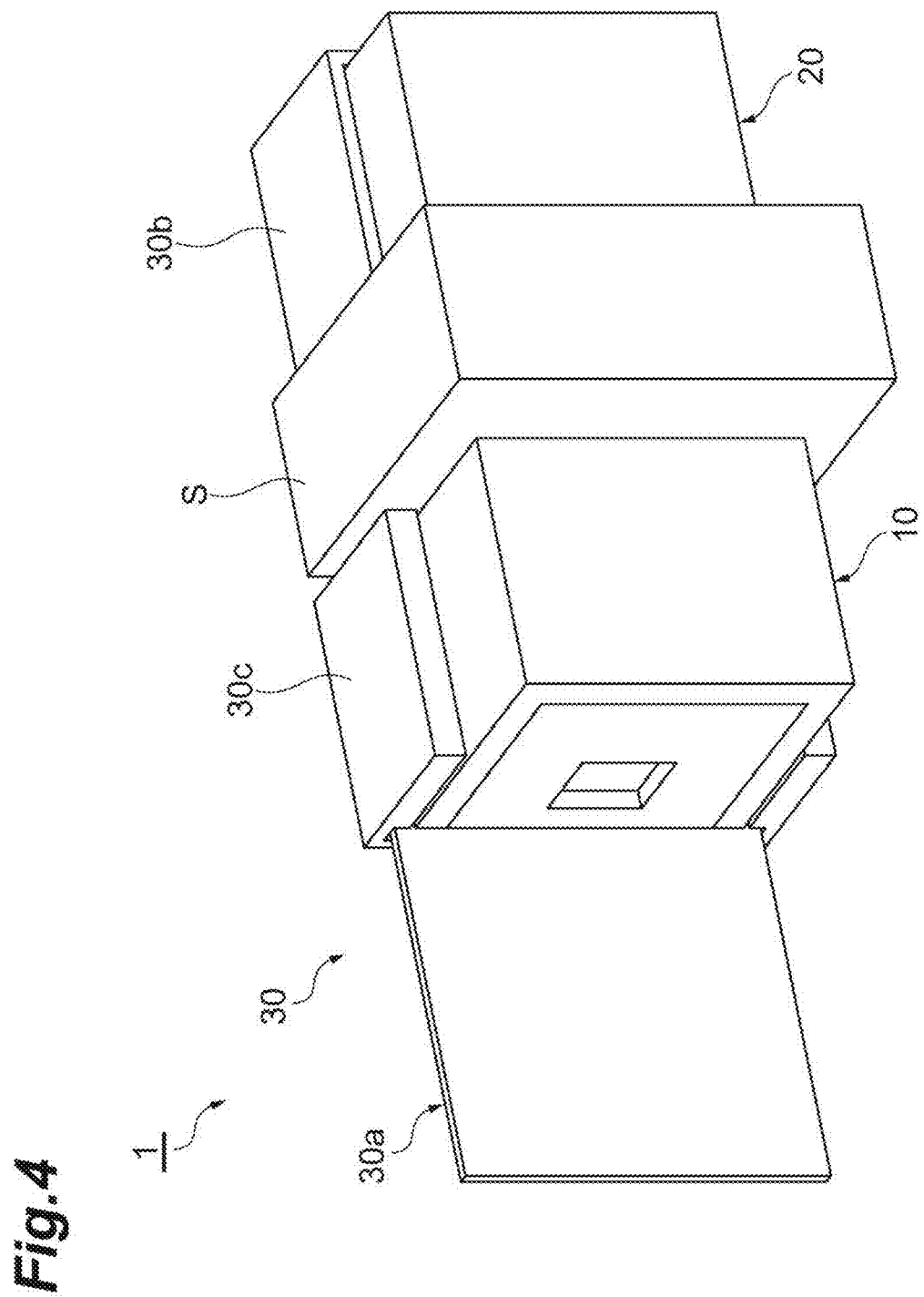
FIG. 4 is a perspective view illustrating a state where measurement light is measured by the spectroscopic measurement device of FIG. 2.

An example of the measurement target S is a plant, although not particularly limited. The measurement target S is also referred to as a sample or a specimen. The measurement target S may also be a substance in a form of liquid, powder, or gas, stored in a container, for example, in addition to a solid substance. The thickness of the measurement target S is not particularly limited, and the measurement target S may be thin, for example, as illustrated in FIG. 3, or it may be thick as illustrated in FIG. 4.

Figure 7:
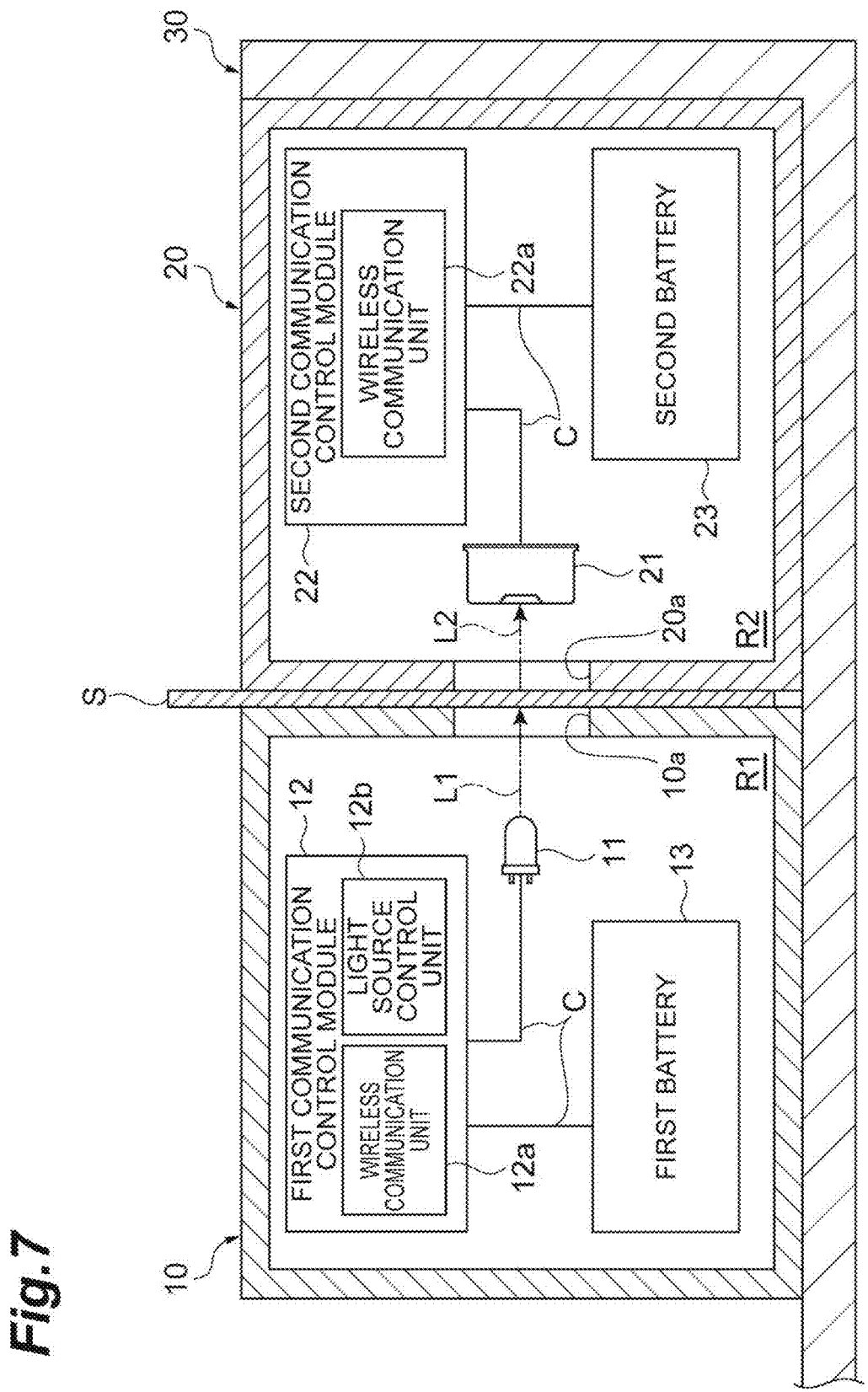
FIG. 7 is a diagram schematically illustrating a cross section taken along line VII-VII of FIG. 3.

As illustrated in FIGS. 5 and 7, the first housing 10 is box member having a rectangular parallelepiped outer shape and having an internal space R1. The first housing 10 is a light projection block for projecting light L1 onto the measurement target S. The first housing 10 houses the light source 11, a first communication control module 12, and a first battery 13 in the internal space R1.

The light source 11 emits the light L1. Examples of the light source 11 include a light emitting diode or a mini lamp (incandescent light bulb). The light source 11 is provided so as to be changeable in the first housing 10. Specifically, wavelength characteristics of the light L1 of the light source 11 are changeable in accordance with the measurement application. For example, when a light emitting diode in the ultraviolet range is used as the light source 11, it is possible to measure the fluorescence of the measurement target S. For example, when a white light emitting diode is used as the light source 11, it is possible to measure the chromaticity of the measurement target S. In addition, when a light emitting diode is used as the light source 11, it is possible to turn on and off the light source 11 in a short cycle with pulse lighting.

The first communication control module 12 includes a central processing unit (CPU). The first communication control module 12 includes: a wireless communication circuit configured to implement a wireless communication function with the outside; and a driver circuit configured to implement a control function of the light source 11. The first communication control module 12 is electrically connected to the light source 11 and the first battery 13 via a cable C such as a flexible cable having flexibility or elasticity.

The first communication control module 12 functionally includes a wireless communication unit (control signal reception unit) 12a, and a light source control unit 12b. The wireless communication unit 12a receives a control signal (also referred to as a control command) for controlling the light source 11 from the outside by wireless communication. The light source control unit 12b performs control (ON/OFF control, etc.) of the light source 11 on the basis of the control signal received by the wireless communication unit 12a. The first battery 13 supplies electric power to the light source 11 and the first communication control module 12.

The first housing 10 has a first opening 10a through which the light L1 emitted from the light source 11 passes. The first opening 10a having a circular cross section is provided on an optical axis of the light L1 from the light source 11 through an outer wall of the first housing 10. The first opening 10a is closed with a transparent member (such as an acrylic plate) that transmits the light L1. This makes it possible to prevent the measurement target S from directly coming in contact with the light source 11. Note that a lens may be disposed in the first opening 10a so as to facilitate enhancement of the ability to collect the light L1. The first housing 10 has a light shielding property. Here, the first housing 10 is formed of resin having high light shielding property so as not to obstruct wireless communication by a wireless communication unit 12a.

The second housing 20 is box member having a rectangular parallelepiped outer shape and having an internal space R2. The second housing 20 is a light receiving block for receiving measurement light L2 from the measurement target S. The second housing 20 houses the spectrometer 21, the second communication control module 22, and the second battery 23 in the internal space R2.

The spectrometer 21 receives the measurement light L2, and analyzes the measurement light L2 separately for individual wavelengths. Examples of the spectrometer 21 applicable include a micro-spectrometer or a micro-spectroscopic sensor. The second communication control module 22 includes a CPU or the like. The second communication control module 22 includes a wireless communication circuit configured to implement a wireless communication function with the outside. The second communication control module 22 is electrically connected to the spectrometer 21 and the second battery 23 via the cable C.

The second communication control module 22 functionally includes a wireless communication unit (measurement result transmission unit, control signal reception unit) 22a. The wireless communication unit 22a transmits a signal related to the measurement result of the spectrometer 21 to the outside by wireless communication. The second battery 23 supplies electric power to the spectrometer 21 and the second communication control module 22.

The second housing 20 has a second opening 20a through which the measurement light L2 passes. The spectrometer 21 is disposed at a position in proximity to the second opening 20a in the internal space R2 in a state where an entrance slit of the spectrometer 21 faces the second opening 20a. The second opening 20a is closed with a transparent member (such as an acrylic plate) that transmits the measurement light L2. This makes it possible to prevent the measurement target S from directly coming in contact with the spectrometer 21. Note that a lens may be disposed in the second opening 20a so as to facilitate enhancement of the ability to collect the measurement light L2. The second housing 20 has a light shielding property. Here, the second housing 20 is formed of resin having high light shielding property so as not to obstruct wireless communication by a wireless communication unit 22a.

Figure 2:
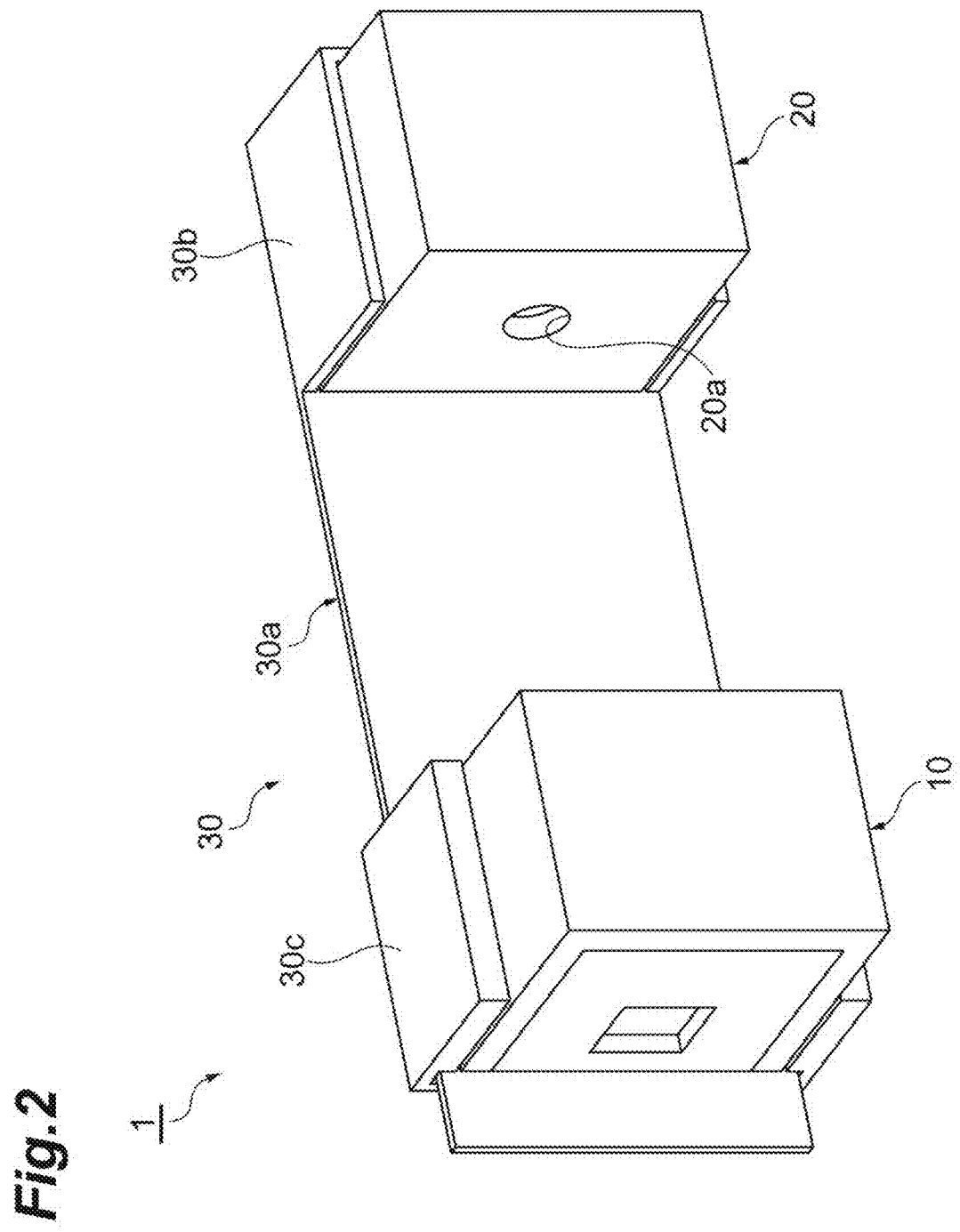
FIG. 2 is a perspective view illustrating a spectroscopic measurement device of FIG. 1.
Figure 6:
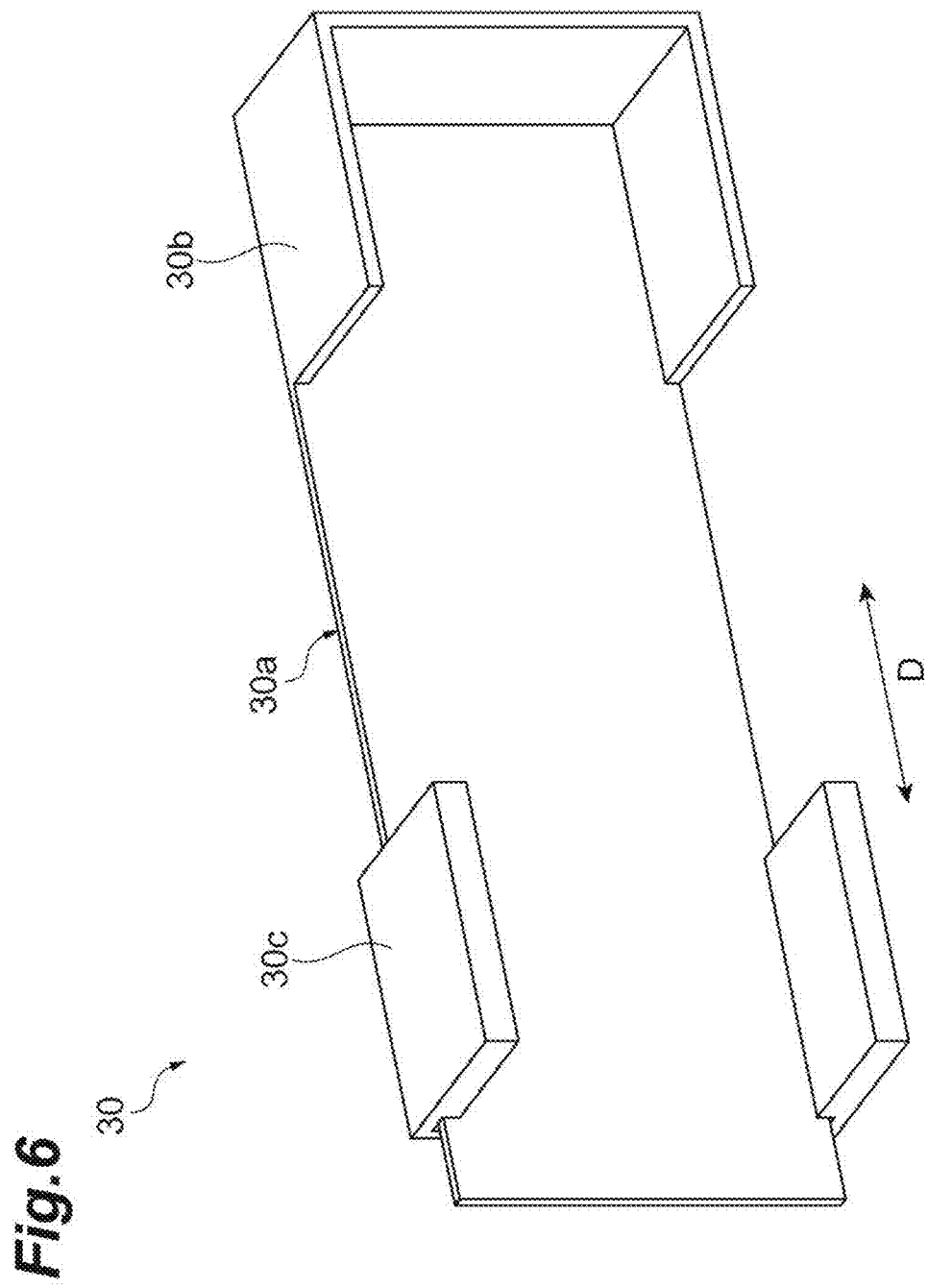
FIG. 6 is a perspective view illustrating an attachment of the spectroscopic measurement device of FIG. 2.

As illustrated in FIGS. 2, 6, and 7, the attachment 30 detachably holds the first housing 10 and the second housing 20 so that the light source 11 of the first housing 10 and the spectrometer 21 of the second housing 20 are disposed at desired relative positions. The desired relative position in the present embodiment is a position where the optical axis of the light L1 to be emitted onto the measurement target S and the optical axis of the measurement light L2 output from the measurement target S are coaxial, being a position at which the first housing 10 and the second housing 20 are in contact with the measurement target S.

The attachment 30 includes a main body 30a, a first holding part 30b, and a second holding part 30c. The main body 30a has an elongated rectangular flat plate shape. The first holding part 30b detachably holds the first housing 10 with respect to the main body 30a. The first holding part 30b includes a wall portion upright on one end portion in a longitudinal direction D of the main body 30a. The wall portion constituting the first holding part 30b is formed so as to be engaged with the first housing 10 in three directions except for the other side (the other end portion side) opposite to the one side (one end portion side) in the longitudinal direction D of the main body 30a. The attachment 30 uses the first holding part 30b to hold the first housing 10 such that the first opening 10a faces the other side in the longitudinal direction D of the main body 30a. The first housing 10 may be detachably secured to the main body 30a or the first holding part 30b by a screw or the like.

The second holding part 30c detachably holds the second housing 20 with respect to the main body 30a. The second holding part 30c includes a wall portion so as to be slidable (slidably) in the longitudinal direction D of the main body 30a. The wall portion constituting the second holding part 30c is formed so as to be engaged (sandwiched) with the second housing 20 in two directions in the short-side direction (direction orthogonal to the longitudinal direction D) of the main body 30a. The second holding part 30c of the attachment 30 holds the second housing 20 such that the second opening 20a faces one side in the longitudinal direction D of the main body 30a. The second housing 20 may be detachably secured to the second holding part 30c by a screw or the like.

The attachment 30 holds the first housing 10 and the second housing 20 such that the first opening 10a and the second opening 20a face each other. In other words, the attachment 30 holds the first housing 10 and the second housing 20 such that the optical axis of the light L1 emitted on the measurement target S and the optical axis of the measurement light L2 output from the measurement target S are coaxial. Thereafter, the attachment 30 slides the second holding part 30c, from this state, in the longitudinal direction D of the main body 30a, making it possible to slide the first opening 10a with respect to the second opening 20a in a direction of allowing the first housing 10 and the second housing 20 to come closer to or away from each other (in the longitudinal direction D of the main body 30a).

In contrast to the above configuration, it is also possible to employ a configuration in which the second housing 20 is held by the first holding part 30b and the first housing 10 is held by the second holding part 30c. In this case, the second housing 20 can be slid with respect to the first housing 10 in a direction to allow the first opening 10a and the second opening 20a to come closer to or away from each other.

As illustrated in FIGS. 1 and 7, the wireless communication unit 12a of the first housing 10 and the wireless communication unit 22a of the second housing 20 can wirelessly communicate with a wireless gateway 71 connected to the network N. The wireless communication unit 12a of the first housing 10 receives a control signal for controlling the light source 11 from the network N via the wireless gateway 71. The wireless communication unit 22a of the second housing 20 transmits the measurement result of the spectrometer 21 onto the network N via the wireless gateway 71.

As illustrated in FIG. 1, the data processing server 50 is connected to the network N. The data processing server 50 receives the measurement result of the spectrometer 21 from the network N. The data processing server 50 is a measurement result processing device that performs various data processing related to the received measurement result. The data processing server 50 performs at least one of data analysis, data calculation, and data accumulation on the basis of the received measurement result. For example, the data processing server 50 calculates and accumulates optical properties such as chromaticity and fluorescence properties of the measurement target S. The data processing server 50 transmits the processing result on the network N. The data processing server 50 constitutes a cloud server.

The mobile information terminal 60 is a control terminal having an interface such as a touch panel. An example of the mobile information terminal 60 is a tablet terminal. The mobile information terminal 60 is not particularly limited, and may be a smartphone, a personal computer, or the like. The mobile information terminal 60 generates a control signal to control the light source 11 in accordance with operation (input to the interface) by an operator.

The mobile information terminal 60 is capable of wireless communication with the wireless gateway 72 connected to the network N. The mobile information terminal 60 transmits the generated control signal onto the network via the wireless gateway 72. The mobile information terminal 60 receives various processing results of the data processing server 50 from the network N via the wireless gateway 72. The mobile information terminal 60 displays the received processing result on the interface. This allows the operator to confirm or refer to the processing result.

Next, a method for performing transmitted light measurement of the measurement target S using the spectroscopic measurement device 1 in the spectrometry system 100 will be described.

As illustrated in FIG. 2, the first housing 10 is first disposed in the first holding part 30b of the attachment 30 and the second housing 20 is disposed in the second holding part 30c so that the first opening 10a and the second opening 20a face each other. With this arrangement, the optical axis of the light L1 emitted on the measurement target S and the optical axis of the measurement light L2 output from the measurement target S are coaxial. Next, the measurement target S is disposed between the first housing 10 and the second housing 20, and then, as illustrated in FIG. 3, the second holding part 30c is slid in the longitudinal direction D of the main body 30a until the measurement target S abuts both the first housing 10 and the second housing 20 (or until a pressing force of a predetermined level or more is generated after the abutment).

Subsequently, as illustrated in FIGS. 1 and 7, an operator operates the mobile information terminal 60 so as to transmit a control signal for driving the light source 11 from the mobile information terminal 60 to the network N. In response to this, the wireless communication unit 12a of the first housing 10 receives the control signal from the network N, and then, the light source control unit 12b controls the light source 11 to emit the light L1 from the light source 11 on the basis of the control signal. The emitted light L1 passes through the first opening 10a to be emitted on the measurement target S. The measurement light L2 as the transmitted light travels toward the second opening 20a and is then received and measured by the spectrometer 21.

The measurement result of the spectrometer 21 is transmitted to the data processing server 50 via the network N by the wireless communication unit 22a of the second housing 20. The data processing server 50 performs data processing of the received measurement result. The data processing server 50 transmits the data processing result to the mobile information terminal 60 via the network N. As a result, the processing result received on the mobile information terminal 60 is displayed on the interface.

As described above, the spectroscopic measurement device 1 attaches the first housing 10 and the second housing 20 to the attachment 30. This enables the first housing 10 and the second housing 20 to be held in a desired positional relationship corresponding to the attachment 30, and consequently enables the light source 11 housed in the first housing 10 and the spectrometer 21 housed in the second housing 20 to be disposed at desired relative positions with a simple configuration. Additionally, the first housing 10 and the second housing 20 have a light shielding property, and thus, can shield external light without a need to provide a separate configuration. Accordingly, it is possible to arrange the light source 11 and the spectrometer 21 at desired relative positions and downsize the apparatus.

In the spectroscopic measurement device 1, the attachment 30 holds the first housing 10 and the second housing 20 so that the first opening 10a and the second opening 20a face each other. Therefore, the transmitted light transmitted through the measurement target S can be received by the spectrometer 21 as the measurement light.

In the spectroscopic measurement device 1, the attachment 30 holds the first housing 10 slidably with respect to the second housing 20 in a direction to allow the first opening 10a and the second opening 20a to come closer to or away from each other. Therefore, the measurement target S can be firmly sandwiched and held between the first housing 10 and the second housing 20 regardless of the thickness of the measurement target S. In addition, sandwiching and holding the measurement target S between the first housing 10 and the second housing 20 would suppress generation of a gap between the measurement target S and the first housing 10 and between the measurement target S and the second housing 20, making it possible to effectively block the external light. Furthermore, by sliding the first housing 10 with respect to the second housing 20 so that the first opening 10a and the second opening 20a come close to each other, it is possible to reduce the optical path of the light L1 from the light source 11 to the measurement target S (distance between the light source 11 and the measurement target S). The longer the optical path of the light L1, the lower the efficiency (sensitivity) becomes in inverse proportion to the square of the distance, and this would increase the noise included in the spectrometry. Therefore, reducing the optical path of the light L1 leads to effectiveness in implementing accurate spectrometry.

The spectrometry system 100 includes the spectroscopic measurement device 1. Therefore, it is possible to obtain the above-described effects of being able to arrange the light source 11 and the spectrometer 21 at desired relative positions and to achieve downsizing of the apparatus. Furthermore, it is possible to have a configuration in which the spectroscopic measurement device 1 has no measurement result processing function, leading to downsizing of the spectroscopic measurement device 1.

The spectrometry system 100 includes: a mobile information terminal 60 configured to generate a control signal for controlling the light source 11 in accordance with operation of an operator and transmit the control signal; a wireless communication unit 12a provided in the spectroscopic measurement device 1 and configured to receive the control signal from the mobile information terminal 60 via the network N; and a light source control unit 12b provided in the spectroscopic measurement device 1 and configured to control the light source 11 on the basis of the control signal received by the wireless communication unit 12a. With this configuration, it is possible to remotely operate the light source 11.

Second Embodiment

Next, a spectroscopic measurement device 1B according to a second embodiment will be described with reference to FIGS. 8 and 9. In the description of the present embodiment, points different from the first embodiment will be described, and duplicate description will be omitted.

The spectroscopic measurement device 1B includes an attachment 31 in place of the attachment 30 (refer to FIG. 6). The spectroscopic measurement device 1B can perform transmitted light measurement by means of the attachment 31. The attachment 31 detachably holds the first housing 10 and the second housing 20 so that the light source 11 of the first housing 10 and the spectrometer 21 of the second housing 20 are disposed at desired relative positions. The desired relative position in the present embodiment is a position where the optical axis of the light L1 to be emitted onto the measurement target S and the optical axis of the measurement light L2 output from the measurement target S are coaxial, being a position at which the first housing 10 and the second housing 20 are in contact with the measurement target S.

The attachment 31 includes a main body 31a, a first holding part 31b, and a second holding part 31c. The main body 31a has a shape obtained by bending an elongated flat plate into a substantially U shape as viewed from the short-side direction. One end portion and the other end portion in the extending direction of the main body 31a face each other.

The first holding part 31b detachably holds the first housing 10 with respect to the main body 31a. The first holding part 31b includes a wall portion upright on the one end portion in the extending direction of the main body 31a. The wall portion constituting the first holding part 31b is formed so as to be engaged with the first housing 10 in three directions except for the other side in the extending direction of the main body 31a (that is, the curved portion side of the substantially U shape). In the attachment 30, the first holding part 31b holds the first housing 10 such that the first opening 10a faces the other end portion side (second holding part 31c side) of the main body 31a. The first housing 10 may be detachably secured to the main body 31a or the first holding part 31b by a screw or the like.

Furthermore, the second holding part 31c detachably holds the second housing 20 with respect to the main body 31a. The second holding part 31e includes a wall portion upright on the other end portion in the extending direction of the main body 31a. The wall portion constituting the second holding part 31e is formed so as to be engaged with the second housing 20 in three directions except for one side in the extending direction of the main body 31a (that is, on the substantially U-shaped curved portion side). In the attachment 30, the second holding part 31c holds the second housing 20 such that the second opening 20a faces the one end portion side (the first holding part 31b side) of the main body 31a. The second housing 20 may be detachably secured to the main body 31a or the second holding part 31e by a screw or the like.

The attachment 31 holds the first housing 10 and the second housing 20 such that the first opening 10a and the second opening 20a face each other. In other words, the attachment 31 holds the first housing 10 and the second housing 20 such that the optical axis of the light L1 emitted on the measurement target S and the optical axis of the measurement light L2 output from the measurement target S are coaxial. Thereafter, the attachment 31 further bends the main body 31a from this state so that the end of the substantially U-shaped opening narrows or widens, making it possible to change the relative position of (relative distance between) the first housing 10 and the second housing 20 in a direction that allows the first opening 10a and the second opening 20a to come closer to or away from each other (opposing direction of the first opening 10a and the second opening 20a).

Next, a method of performing transmitted light measurement of the measurement target S by using the spectroscopic measurement device 1B will be described.

Figure 8:
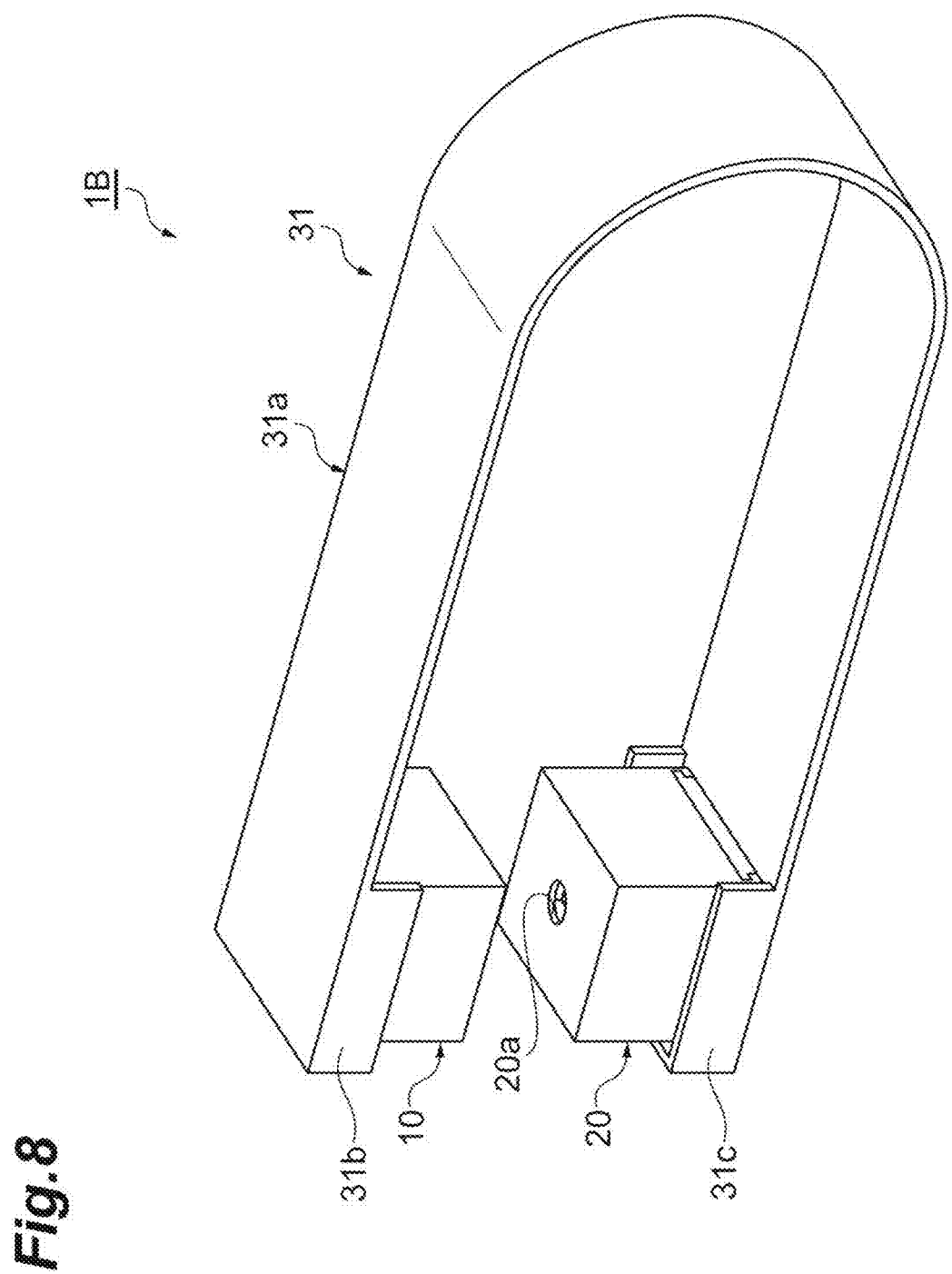
FIG. 8 is a perspective view illustrating a spectroscopic measurement device according to a second embodiment.
Figure 9:
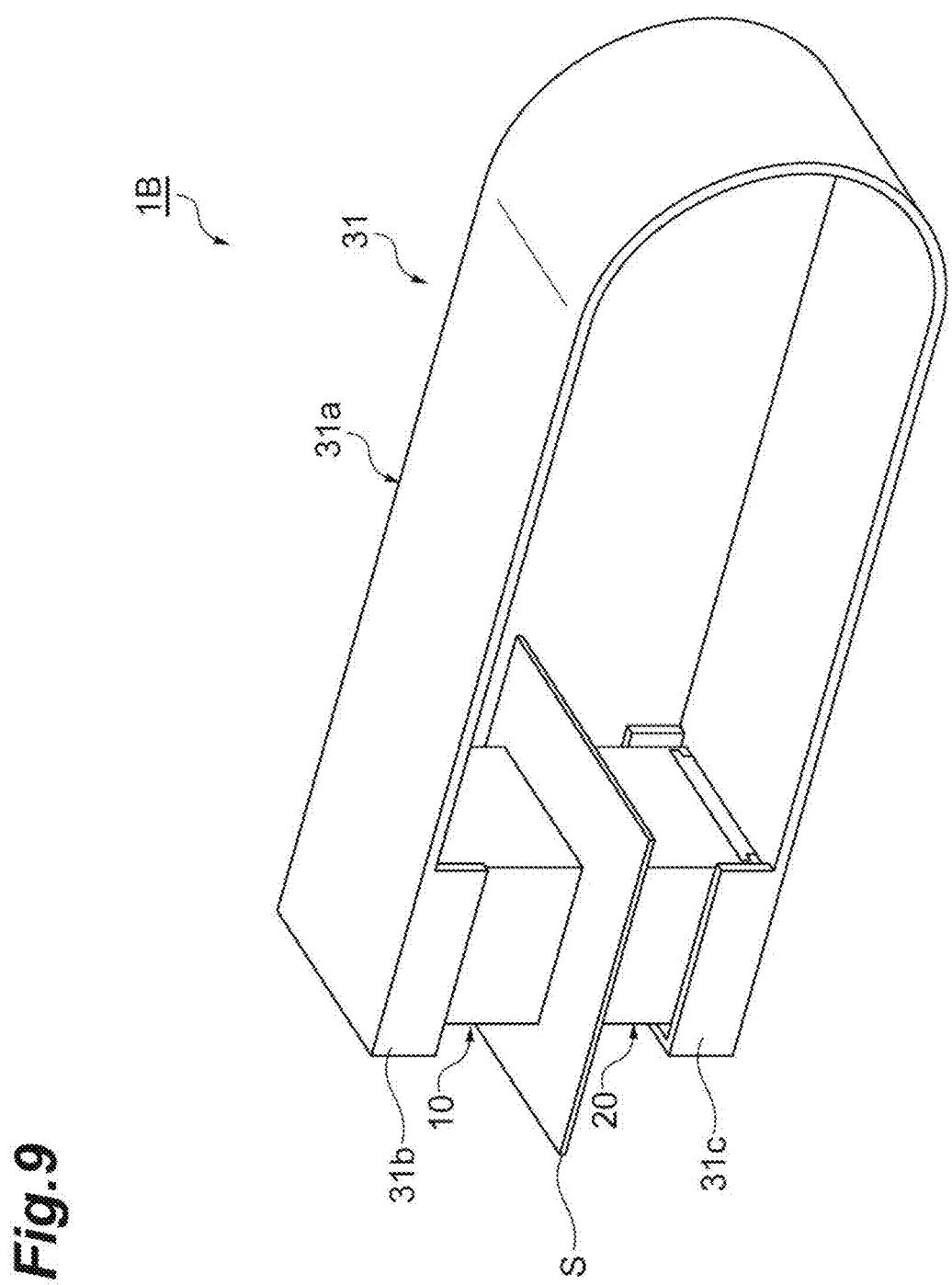
FIG. 9 is a perspective view illustrating a state where measurement light is measured by the spectroscopic measurement device of FIG. 8.

As illustrated in FIG. 8, the first housing 10 is first disposed in the first holding part 31b and the second housing 20 is disposed in the second holding part 31c on the attachment 31 so that the first opening 10a and the second opening 20a face each other. With this arrangement, the optical axis of the light L1 emitted on the measurement target S and the optical axis of the measurement light L2 output from the measurement target S are coaxial. Next, the measurement target S is disposed between the first housing 10 and the second housing 20, and then, as illustrated in FIG. 9, the main body 31a is further bent until the measurement target S abuts both the first housing 10 and the second housing 20 (or until a pressing force of a predetermined level or more is generated after the abutment).

Subsequently, the light L1 is emitted from the light source 11. The emitted light L1 passes through the first opening 10a to be emitted on the measurement target S. The measurement light L2 as the transmitted light travels toward the second opening 20a and is then received and measured by the spectrometer 21.

As described above, it is possible to arrange the light source 11 and the spectrometer 21 at desired relative positions and downsize the apparatus also in the spectroscopic measurement device 1B.

Third Embodiment

Next, a spectroscopic measurement device 1C according to a third embodiment will be described with reference to FIG. 10. In the description of the present embodiment, points different from the first embodiment will be described, and duplicate description will be omitted.

The spectroscopic measurement device 1C includes an attachment 32 in place of the attachment 30 (refer to FIG. 6). The spectroscopic measurement device 1C can perform transmitted light measurement by means of the attachment 32. The attachment 32 detachably holds the first housing 10 and the second housing 20 so that the light source 11 of the first housing 10 and the spectrometer 21 of the second housing 20 are disposed at desired relative positions. The desired relative position in the present embodiment is a position at which the optical axis of the light L1 emitted on the measurement target S and the optical axis of the measurement light L2 output from the measurement target S are coaxial.

The attachment 32 detachably holds the first housing 10, the cuvette S1, and the second housing 20 sequentially in this order. The cuvette S1 herein is a container formed of a transparent member (glass, resin, quartz, or the like) that transmits the light L1 and the measurement light L2, and accommodates the measurement target S.

The attachment 32 includes a main body 32a, wall portions 32b and 32e, and column portions 32c and 32d. The main body 32a has a rectangular plate shape. The wall portions 32b and 32e and the column portions 32c and 32d are provided upright on the main body 32a. The wall portions 32b and 32e and the column portions 32c and 32d hold the first housing 10, the cuvette S1 containing the measurement target S, and the second housing 20.

The wall portion 32b is formed in an L shape along an edge portion on one side in the longitudinal direction of the main body 32a in plan view. Specifically, the wall portion 32b includes a portion along one end edge of the main body 32a and a portion along one side edge continuing to the one end edge. The wall portion 32e is formed in an L shape along the other edge portion on the opposite side to the one side in the longitudinal direction of the main body 32a in plan view. Specifically, the wall portion 32e has a portion along the other end edge opposite to the one end edge of the main body 32a, and a portion along one side edge continuing from the other end edge.

The column portion 32c is formed between the wall portions 32b and 32e in the longitudinal direction of the main body 32a so as to be continuous with the wall portions 32b and 32e. The column portion 32c is formed thicker in the short-side direction of the main body 32a than the wall portions 32b and 32e. The column portion 32d is provided upright at a predetermined interval in the short-side direction of the main body 32a with respect to the column portion 32c. This predetermined interval corresponds to the external dimension of the cuvette S1 (length of the cuvette S1 in the short-side direction of the main body 32a in a state where the cuvette S1 is held by the attachment 32). Furthermore, the column portion 32d is formed such that the width of the main body 32a in the longitudinal direction is substantially the same as the width of the column portion 32c. This width corresponds to the external dimension of the cuvette S1 (length of the cuvette S1 in the longitudinal direction of the main body 32a in a state where the cuvette S1 is held by the attachment 32).

The wall portion 32b and the column portions 32c and 32d define a space to contain the first housing 10 so as to be engaged with the first housing 10. The wall portion 32e and the column portions 32c and 32d define a space to contain the second housing 20 so as to be engaged with the second housing 20. The first housing 10 and the second housing 20 may be detachably secured to at least one of the main body 32a, the wall portions 32b and 32e, and the column portions 32c and 32d by a screw or the like.

With the above configuration, the attachment 32 holds the first housing 10 such that the first opening 10a faces the cuvette S1 side by the wall portion 32b and the column portions 32c and 32d. Furthermore, the attachment 32 holds the second housing 20 such that the second opening 20a faces the cuvette S1 side by the wall portion 32e and the column portions 32c and 32d. That is, the attachment 32 holds the first housing 10 and the second housing 20 so that the first opening 10a and the second opening 20a face each other. In other words, the attachment 32 holds the first housing 10 and the second housing 20 such that the optical axis of the light L1 emitted on the cuvette S1 and the optical axis of the measurement light L2 output from the cuvette S1 are coaxial. Furthermore, the attachment 32 holds the cuvette S1 by the column portions 32c and 32d.

Note that the column portion 32c may include, at its tip, a pressing part for pressing at least one of the first housing 10 and the second housing 20 toward the main body 32a side. Specifically, the column portion 32c may have an elongated pressing part extending from the tip of the column portion 32c to both ends in the longitudinal direction of the main body 32a at a position having a height substantially the same as the height of the upper surface of the first housing 10 (the second housing 20) in illustration. In other words, the column portion 32c may have a substantially T shape including the pressing part formed at the distal end side as viewed in the short-side direction of the main body 32a. In this case, the attachment 32 can firmly hold the first housing and the second housing.

Next, a method of performing transmitted light measurement of the measurement target S contained in the cuvette S1 by using the spectroscopic measurement device 1C will be described.

Figure 10:
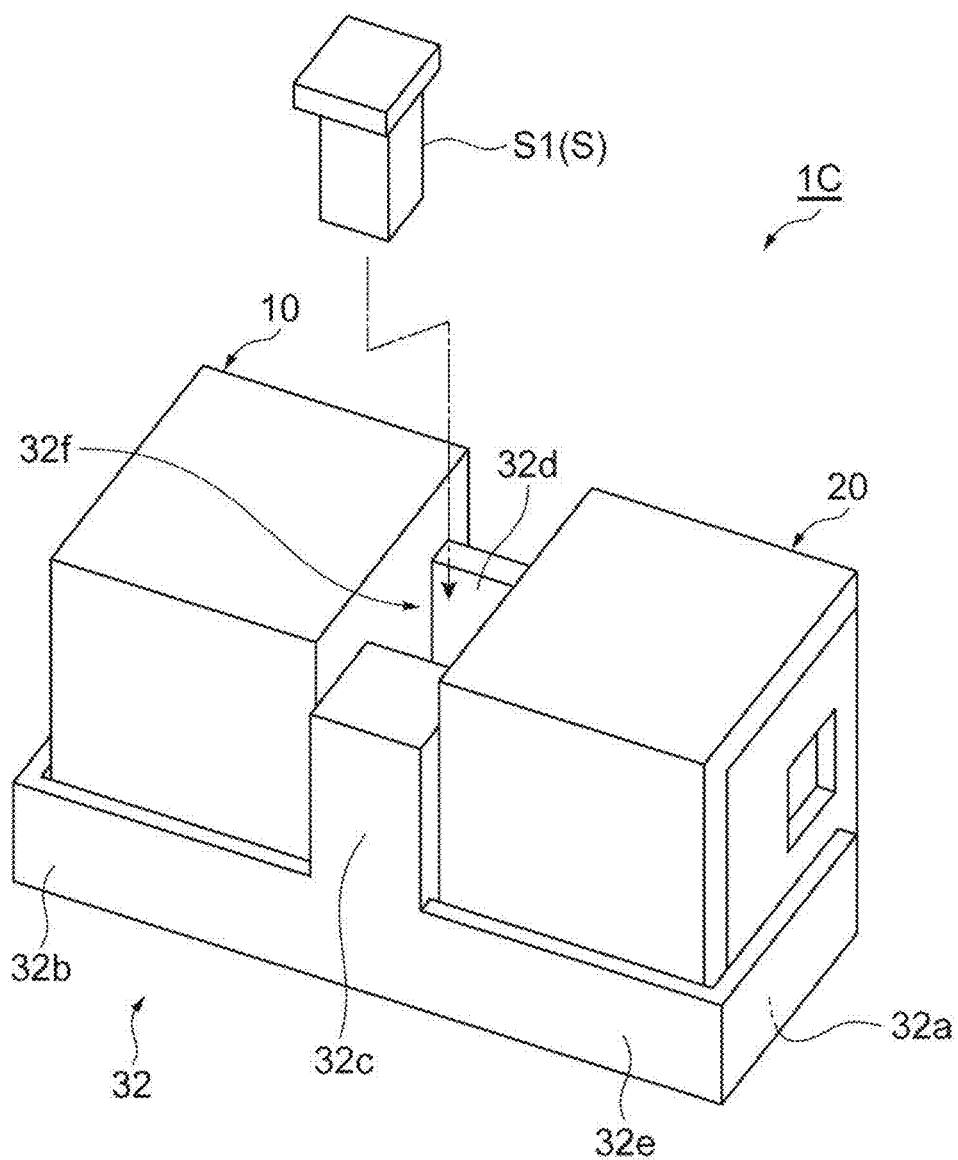
FIG. 10 is a perspective view illustrating a spectroscopic measurement device according to a third embodiment.

As illustrated in FIG. 10, the first housing 10 is first disposed between the wall portion 32b and the column portions 32c and 32d so that the first opening 10a and the second opening 20a face each other, and the second housing 20 is disposed between the wall portion 32e and the column portions 32c and 32d. Next, the cuvette S1 is disposed between the column portions 32c and 32d. With this arrangement, the optical axis of the light L1 emitted on the measurement target S contained in the cuvette S1 and the optical axis of the measurement light L2 output from the measurement target S are coaxial.

Subsequently, the light L1 is emitted from the light source 11. The emitted light L1 passes through the first opening 10a and is directed to the cuvette S1. The measurement light L2 as the transmitted light travels toward the second opening 20a, and then is received and measured by the spectrometer 21.

As described above, it is possible to arrange the light source 11 and the spectrometer 21 at desired relative positions and downsize the apparatus also in the spectroscopic measurement device 1C. Additionally, the spectroscopic measurement device 1C can allow the column portions 32e and 32d of the attachment 32 to function as a position regulator 32f for regulating the position of the cuvette S1, enabling the cuvette S1 to be reliably held by the position regulator 32f.

Fourth Embodiment

Next, a spectroscopic measurement device 1D according to a fourth embodiment will be described with reference to FIGS. 11 to 13. In the description of the present embodiment, points different from the first embodiment will be described, and duplicate description will be omitted.

The spectroscopic measurement device 1D includes an attachment 33 in place of the attachment 30 (refer to FIG. 6). The spectroscopic measurement device 1D includes the attachment 33 to enable diagonal emission of the light L1 to the measurement target S, and enable measurement of measurement light L2 (reflected light) obtained from the light L1 reflected at the measurement target S at an acute angle (here, 45 degrees). In the description of the present embodiment, for the sake of convenience, the side away from the measurement target S will be referred to as "upper side" and the side closer to the measurement target S will be described as "lower side".

The attachment 33 detachably holds the first housing 10 and the second housing 20 so that the light source 11 of the first housing 10 and the spectrometer 21 of the second housing 20 are disposed at desired relative positions. The desired relative position in the present embodiment is a position at which the optical axis of the light L1 emitted on the measurement target S and the optical axis of the measurement light L2 output from the measurement target S intersect each other at a predetermined angle.

The attachment 33 includes a main body 33a, a first holding part 33c, and a second holding part 33d. The main body 33a is a block member including a planar lower surface 33b. The main body 33a has a configuration in which the main body 33a is mounted on the measurement target S, and this configuration allows the lower surface 33b in contact with the measurement target S to function as a position regulator 33g that regulates the position of the measurement target S. The main body 33a includes: a first columnar member 33e having a quadrangular prism-like outer shape having an axial direction inclined with respect to the lower surface 33b; a second columnar member 33f having a quadrangular columnar shape having an axial direction orthogonal to the lower surface 33b. The first holding part 33c is provided on the upper surface of the first columnar member 33e, while the second holding part 33d is provided on the upper surface of the second columnar member 33f.

The first holding part 33c detachably holds the first housing 10 with respect to the main body 33a. The first holding part 33c includes a wall portion upright on the upper surface of the first columnar member 33e. The wall portion constituting the first holding part 33c is formed so as to be engaged with the first housing 10 on three sides except for the side of the second holding part 33d side. The attachment 30 uses the first holding part 33c to hold the first housing 10 in a state where the first opening 10a faces the main body 33a side (upper surface side of the first columnar member 33e). The first housing 10 may be detachably secured to the main body 33a or the first holding part 33c by a screw or the like.

The second holding part 33d detachably holds the second housing 20 with respect to the main body 33a. The second holding part 33d includes a wall portion upright on the upper surface of the second columnar member 33f. The wall portion constituting the second holding part 33d is formed so as to be engaged with the second housing 20 on three sides except for the side of the first holding part 33c. The attachment 30 uses the second holding part 33d to hold the second housing 20 in a state where the second opening 20a faces the main body 33a side (upper surface side of the second columnar member 33f). The second housing 20 may be detachably secured to the main body 33a or the second holding part 33d by a screw or the like.

Figure 12:
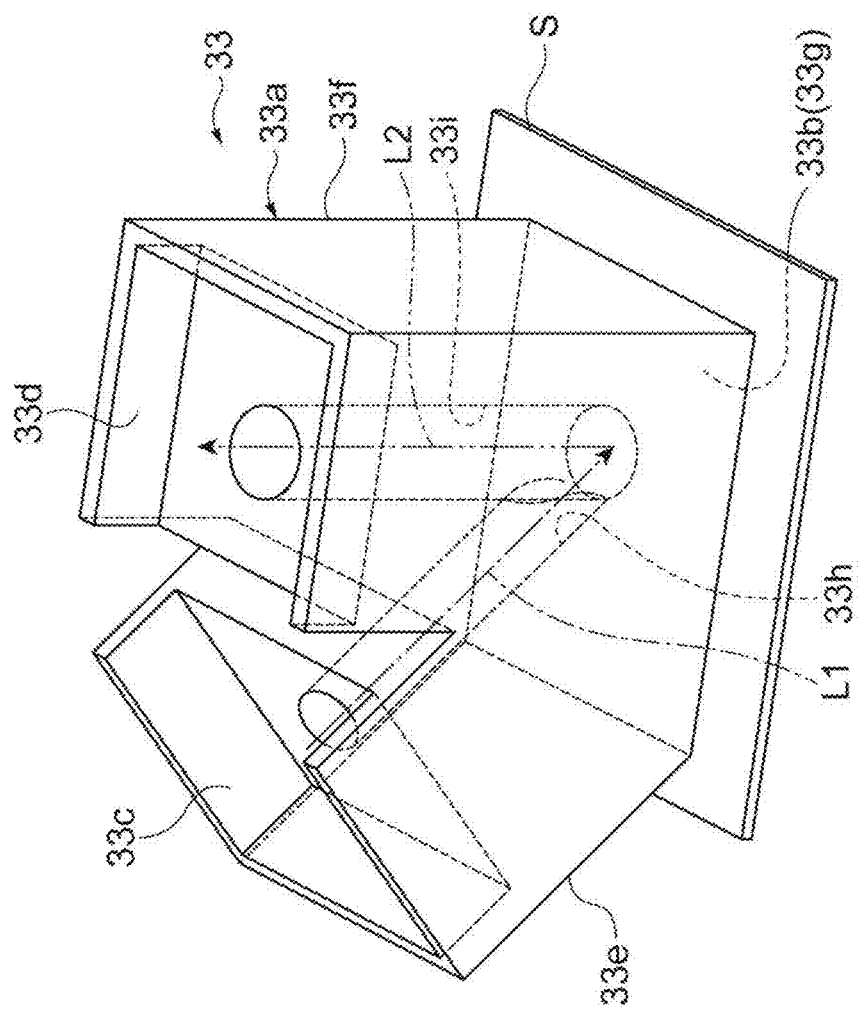
FIG. 12 is a perspective view illustrating a first optical path and a second optical path provided in an attachment of the spectroscopic measurement device of FIG. 11.
Figure 13:
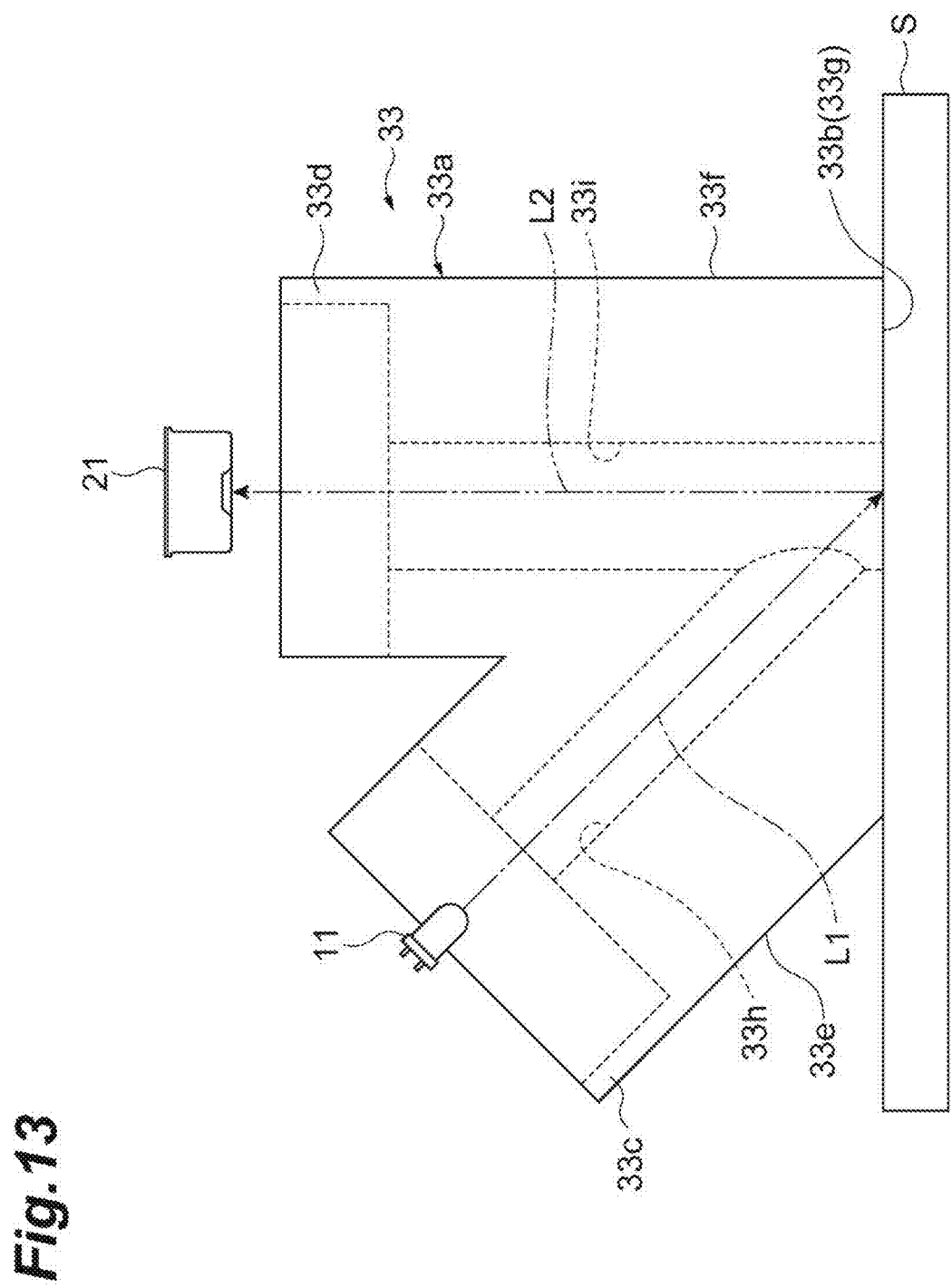
FIG. 13 is a diagram schematically illustrating a cross section taken along line XIII-XIII of FIG. 11.

As illustrated in FIGS. 12 and 13, the main body 33a internally includes: a first optical path 33h being an optical path of the light L1 emitted onto the measurement target S and continuous with the first opening 10a; and a second optical path 33i being an optical path of the measurement light L2 output from the measurement target S and continuous with the second opening 20a.

One end of the first optical path 33h opens to the upper surface of the first columnar member 33e. The other end of the first optical path 33h opens to the lower surface 33b of the main body 33a. One end of the second optical path 33i opens to the upper surface of the second columnar member 33f. The other end of the second optical path 33i opens to the same region as the other end of the first optical path 33h, out of the lower surface 33b of the main body 33a. That is, the other end of the first optical path 33h and the other end of the second optical path 33i share an opening portion on the lower surface 33b of the main body 33a. The angle between the first optical path 33h and the second optical path 33i is set to a predetermined angle in accordance with the measurement application. Here, the angle between the first optical path 33h and the second optical path 33i is set to 45 degrees as an example, but it is not limited thereto, and may be set to 90 degrees, for example.

The attachment 33 has a light shielding property. The attachment 33 here is formed of a resin having high light shielding property so as not to hamper wireless communication by the wireless communication unit 12a and 22a.

Next, a method of performing reflected light measurement of the measurement target S by using the spectroscopic measurement device 1D will be described.

Figure 11:
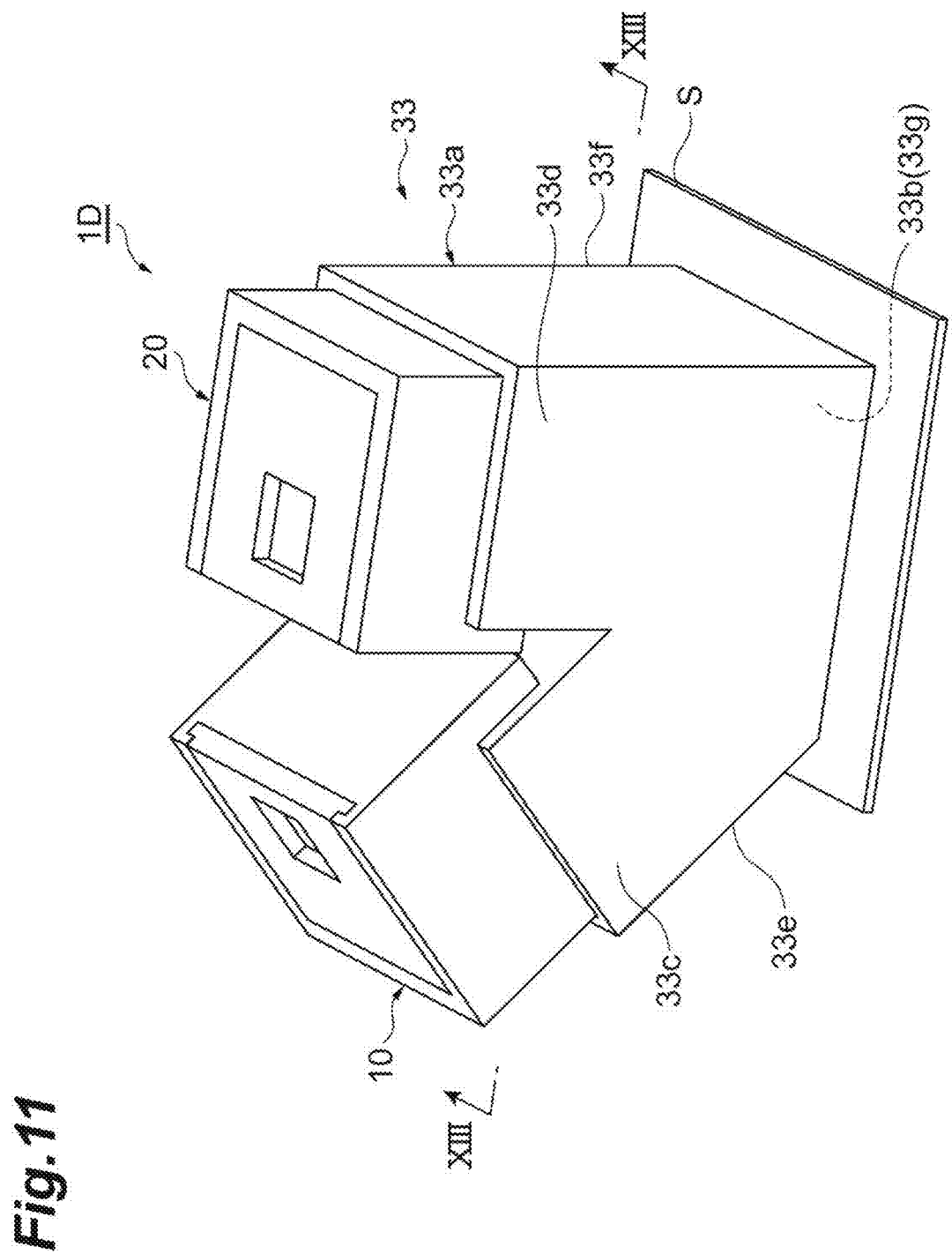
FIG. 11 is a perspective view illustrating a spectroscopic measurement device according to a fourth embodiment.

First, as illustrated in FIG. 11, the attachment 33 is mounted on the measurement target S. Next, the first housing 10 is mounted on the first holding part 33c so that the first opening 10a faces the upper surface of the first columnar member 33e. The second housing 20 is mounted on the second holding part 33d so that the second opening 20a faces the upper surface of the second columnar member 33f. With this configuration, the optical axis of the light L1 emitted on the measurement target S and the optical axis of the measurement light L2 output from the measurement target S are set to intersect each other at a predetermined angle (here, 45 degrees) at a point corresponding to the other end of the first optical path 33h opened in the lower surface 33b of the main body 33a (that is, the other end of the second optical path 33i).

Subsequently, the light L1 is emitted from the light source 11. The emitted light L1 passes through the first opening 10a and the first optical path 33h to be emitted on the measurement target S. The measurement light L2 as the reflected light passes the second optical path 33i and travels toward the second opening 20a, so as to be received and measured by the spectrometer 21.

As described above, it is possible to arrange the light source 11 and the spectrometer 21 at desired relative positions and downsize the apparatus also in the spectroscopic measurement device 1D. Additionally, the main body 33a of the attachment 33 includes the planar lower surface 33b functioning as a position regulator 33g that regulates the position of the measurement target S. Therefore, it is possible to use the lower surface 33b to reliably hold the measurement target S.

In the spectroscopic measurement device 1D, the attachment 33 has a light shielding property, and the attachment 33 internally includes the first optical path 33h and the second optical path 33i. The configuration, in this case, would suppress invasion of external light into the first optical path 33h and the second optical path 33i provided inside the attachment 33.

In the spectroscopic measurement device 1D, the attachment 33 holds the first housing 10 and the second housing 20 so that an optical axis of the light L1 to be emitted onto the measurement target S and an optical axis of the measurement light L2 output from the measurement target S intersect at a predetermined angle (herein, 45 degrees). Therefore, the reflected light reflected by the measurement target S can be received by the spectrometer 21 as the measurement light L2.

Fifth Embodiment

Next, a spectroscopic measurement device 1E according to a fifth embodiment will be described with reference to FIGS. 14 and 15. In the description of the present embodiment, points different from the first embodiment will be described, and duplicate description will be omitted.

The spectroscopic measurement device 1E includes an attachment 34 in place of the attachment 30 (refer to FIG. 6). The spectroscopic measurement device 1E includes the attachment 34 to be able to emit the light L1 toward the cuvette S1 containing the measurement target S, enabling measurement of the measurement light L2 (fluorescence) output from the measurement target S in the direction of 90 degrees with respect to the light L1. In the present embodiment, the upper side (cap side) of the cuvette S1 will be referred to as "upper side" and the opposite side will be described as "lower side" for the sake of convenience.

The attachment 34 detachably holds the first housing 10 and the second housing 20 so that the light source 11 of the first housing 10 and the spectrometer 21 of the second housing 20 are disposed at desired relative positions. The desired relative position in the present embodiment is a position at which the optical axis of the light L1 emitted on the measurement target S and the optical axis of the measurement light L2 output from the measurement target S intersect each other at a predetermined angle.

The attachment 34 includes a main body 34a, a first holding part 34b, and a second holding part 34c. The main body 34a is a block member having a substantially parallelepiped shape. The upper surface of the main body 34a has a recess 34d formed to have a rectangular cross section. The cuvette S1 having a predetermined external dimension is fitted into the recess 34d. In other words, the cuvette S1 can be inserted into the recess 34d without a gap.

The first holding part 34b detachably holds the first housing 10 with respect to the main body 34a. The first holding part 34b includes a wall portion upright on a portion (L-shaped edge portion) of the edge portion on one side surface 34e of the main body 34a. The first housing 10 is positioned on the one side surface 34e by the first holding part 34b and is detachably secured to the main body 34a or the first holding part 34b by a screw or the like. Note that the first holding part 34b may hold the first housing 10 by engaging with the first housing 10.

The second holding part 34c detachably holds the second housing 20 with respect to the main body 34a. The second holding part 34c includes a wall portion upright on a part of the edge portion (L-shaped edge portion) on another side surface 34f adjacent to the one side surface 34e of the main body 34a. The second housing 20 is positioned on the other side surface 34f by the second holding part 34c and is detachably secured to the main body 34a or the second holding part 34c by a screw or the like. Note that the second holding part 34c may hold the second housing 20 by engaging with the second housing 20.

Figure 15:
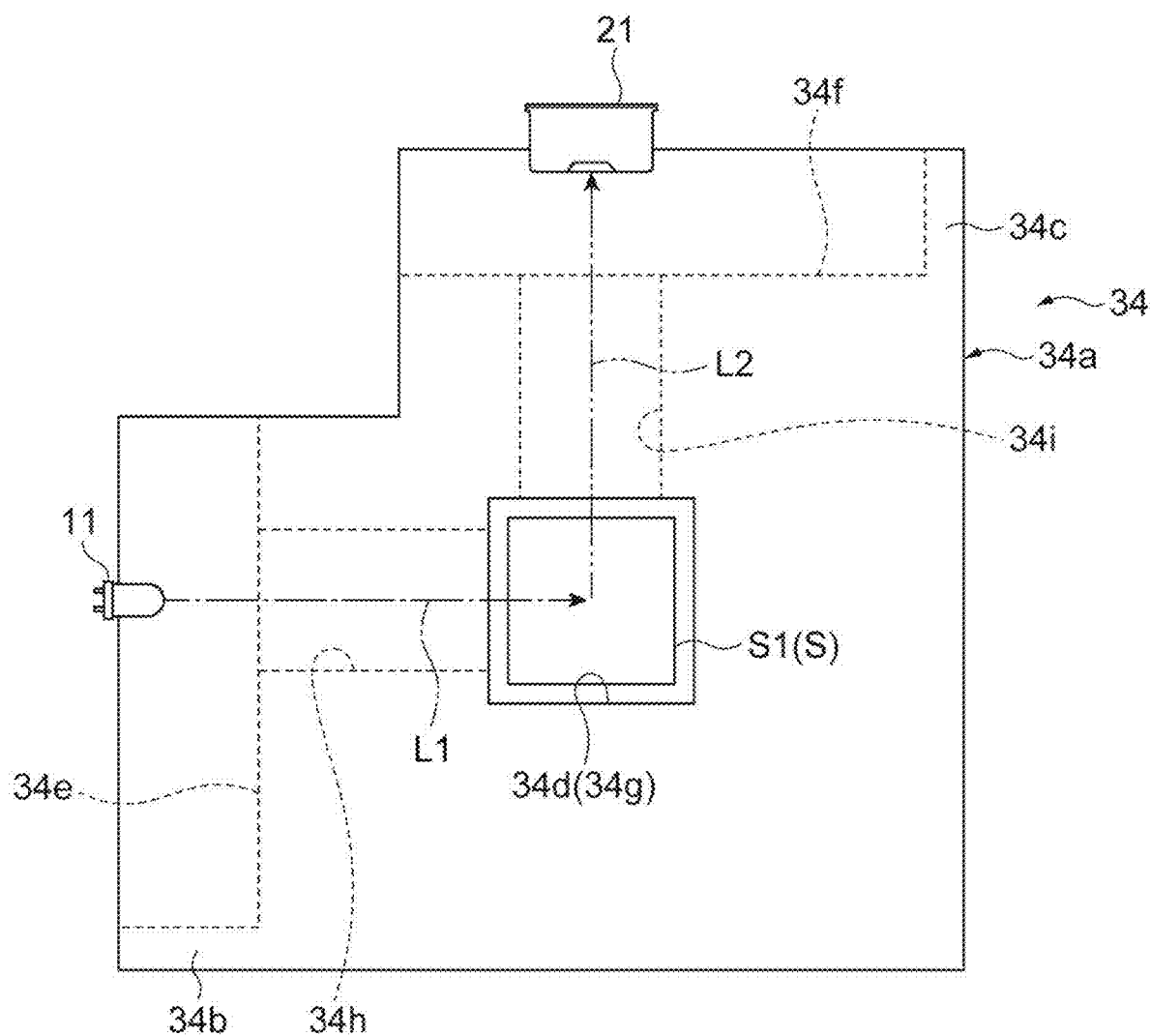
FIG. 15 is a diagram schematically illustrating a cross section taken along line XV-XV of FIG. 14.

As illustrated in FIG. 15, the main body 34a internally includes: a first optical path 34h being an optical path of the light L1 emitted onto the cuvette S1 and continuous with the first opening 10a; and a second optical path 34i being an optical path of the measurement light L2 output from the measurement target S and continuous with the second opening 20a. One end of the first optical path 34h opens to one side surface 34e of the main body 34a. The other end of the first optical path 34h opens to the inner wall surface of the recess 34d of the main body 34a. One end of the second optical path 34i opens to the other side surface 34f of the main body 34a. The other end of the second optical path 34i opens to the other surface adjacent to the inner wall surface of the recess 34d of the main body 34a. The angle between the first optical path 34h and the second optical path 34i is set to a predetermined angle in accordance with the measurement application. Here, the angle between the first optical path 34h and the second optical path 34i is set to 90 degrees as an example, but it is not limited thereto, and may be set to 45 degrees, for example.

The attachment 34 has a light shielding property. The attachment 34 here is formed of a resin having high light shielding property so as not to hamper wireless communication by the wireless communication unit 12a and 22a.

Next, a method of performing fluorescence measurement of the measurement target S contained in the cuvette S1 by using the spectroscopic measurement device 1E will be described.

Figure 14:
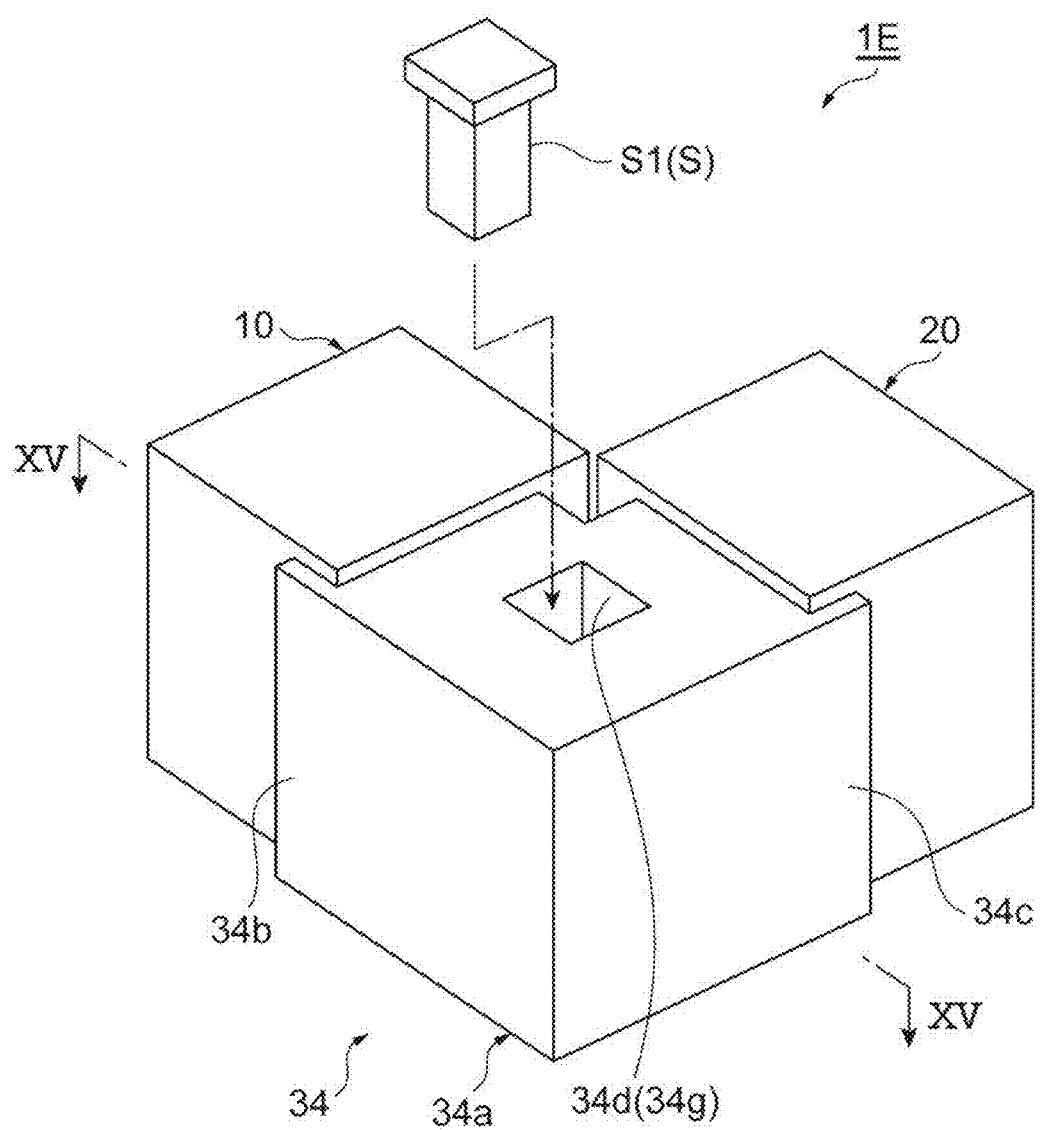
FIG. 14 is a perspective view illustrating a spectroscopic measurement device according to a fifth embodiment.

First, as illustrated in FIG. 14, the first housing 10 is held by the first holding part 34b so that the first opening 10a faces the side surface 34e side (the first holding part 34b side) of the main body 34a. The second housing 20 is held by the second holding part 34c so that the second opening 20a faces the other side surface 34f side (the second holding part 34c side) of the main body 34a. Next, the cuvette S1 is fitted into the recess 34d. With this configuration, the optical axis of the light L1 emitted on the measurement target S contained in the cuvette S1 and the optical axis of the measurement light L2 (fluorescence) output from the measurement target S intersect with each other at a predetermined angle (here, 90 degrees) at a center of the recess 34d of the main body 34a in plan view.

Subsequently, the light L1 is emitted from the light source 11. The emitted light L1 passes through the first opening 10a and the first optical path 34h to be emitted on the measurement target S. The measurement light L2 as the fluorescence passes the second optical path 34i and travels toward the second opening 20a, so as to be received and measured by the spectrometer 21.

As described above, it is possible to arrange the light source 11 and the spectrometer 21 at desired relative positions and downsize the apparatus also in the spectroscopic measurement device 1E. Additionally, the spectroscopic measurement device 1E can allow the recess 34d of the attachment 34 to function as a position regulator 34g for regulating the position of the inserted cuvette S1, enabling the cuvette S1 to be reliably held in the recess 34d.

In the spectroscopic measurement device 1E, the attachment 34 has a light shielding property, and the attachment 34 internally includes the first optical path 34h and the second optical path 34i. The configuration, in this case, makes it possible to suppress invasion of external light into the first optical path 34h and the second optical path 34i provided inside the attachment 34.

While one embodiment of the present invention has been described hereinabove, the present invention is not limited to the above-described embodiments, but may include modifications and other applications obtained within the spirit and scope described in individual claims.

Figure 16:
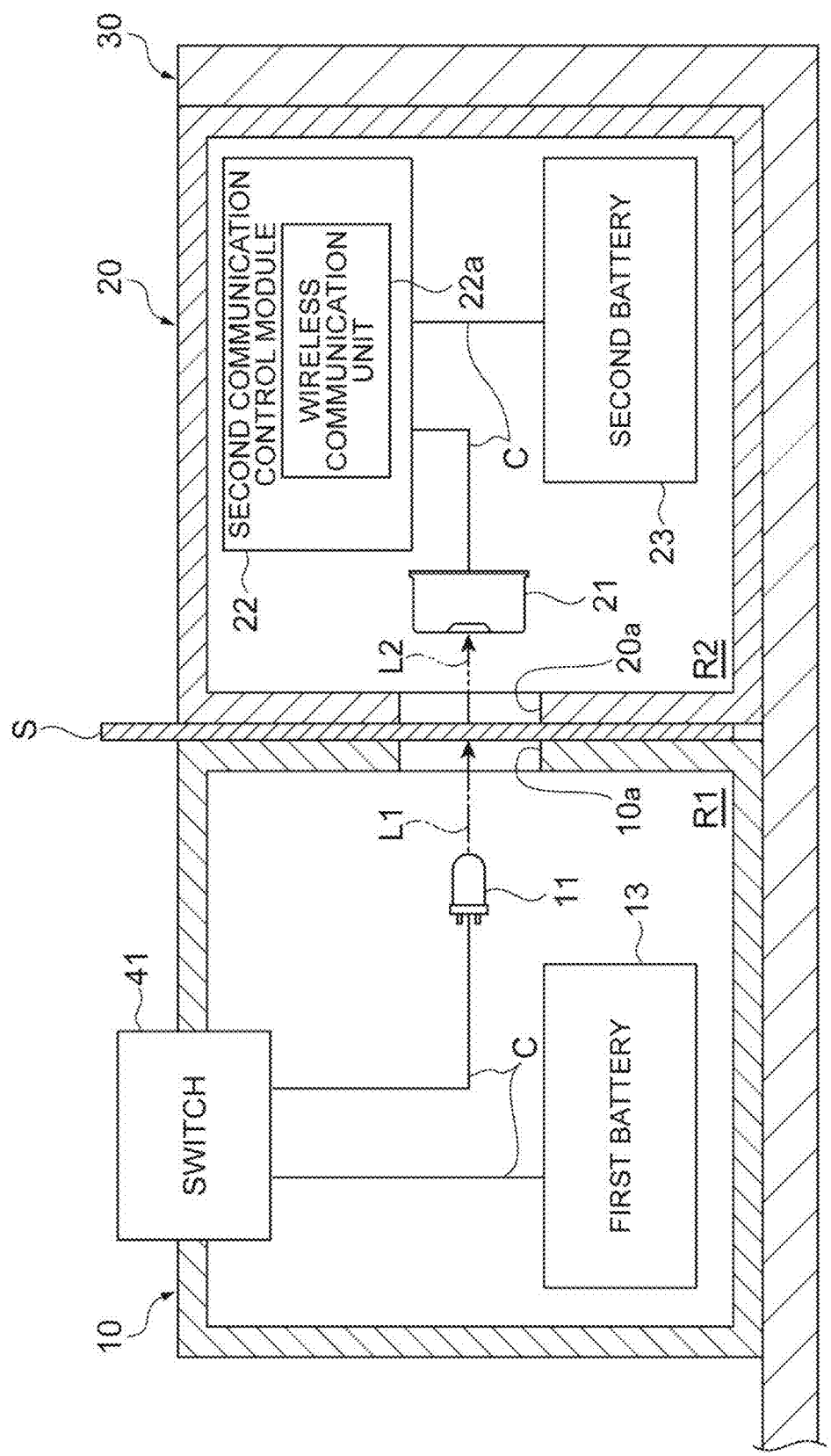
FIG. 16 is a configuration diagram illustrating a spectroscopic measurement device according to a modification.

As illustrated in FIG. 16, the first housing 10 of the above embodiment may have a switch 41 without having the first communication control module 12. In this case, the spectroscopic measurement device 1 enables on/off switching of the light source 11 by operator's operation of the switch 41 instead of a method of receiving the control signal for controlling the light source 11 by the wireless communication unit 12a of the first communication control module 12. With this configuration in which the first communication control module 12 is not included in the first housing 10, it is possible to simplify the configuration. For convenience of explanation, the present modification is described as a modification of the first embodiment in FIG. 16. The present modification, however, is also applicable as modifications of the second, third, fourth, and fifth embodiments as well.

Figure 17:
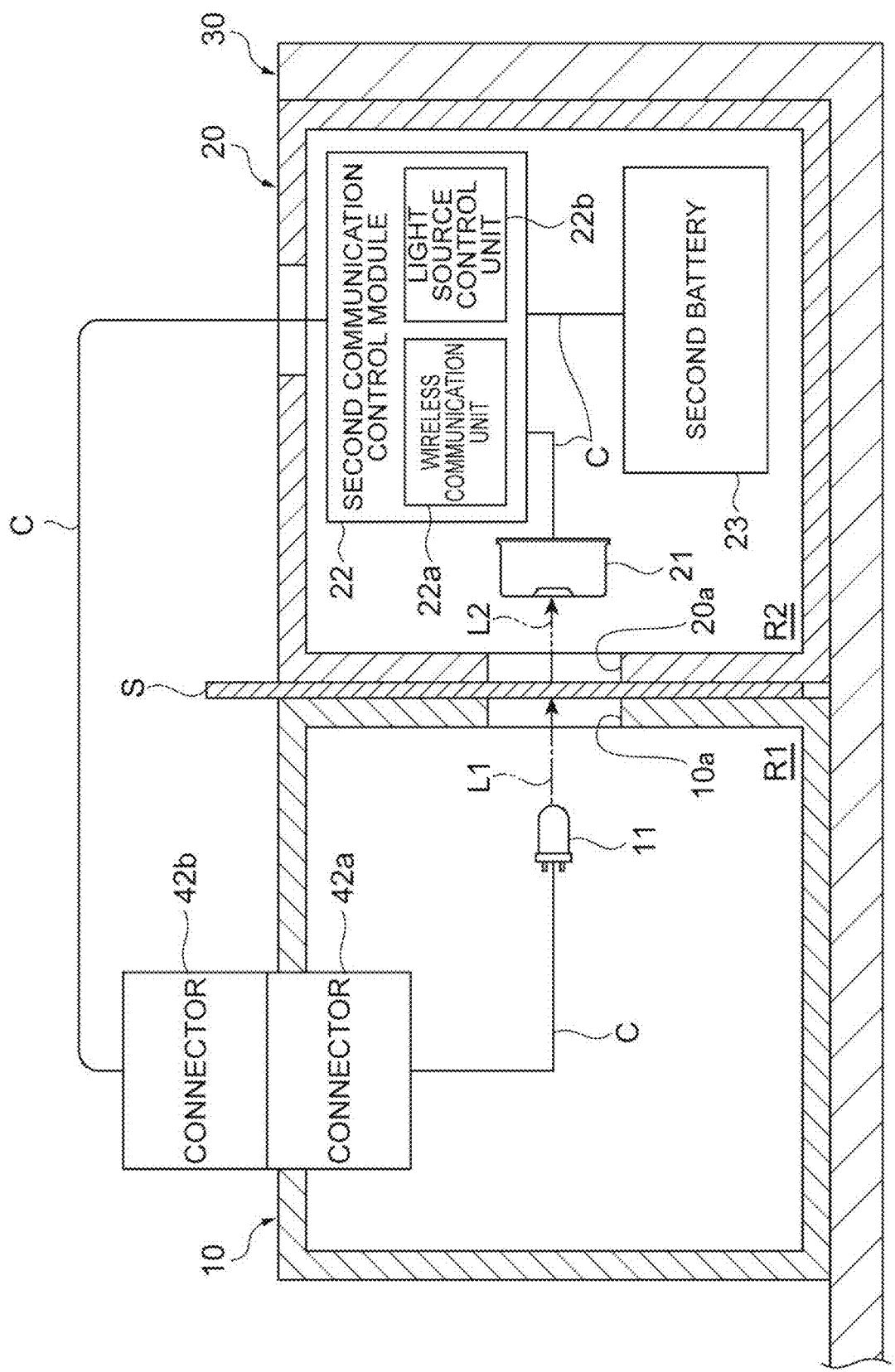
FIG. 17 is a configuration diagram illustrating a spectroscopic measurement device according to a modification.

As illustrated in FIG. 17, the first housing 10 in the above embodiment may have a connector 42a with no first communication control module 12. The second housing 20 may have a connector 42b for connecting to the connector 42a. The second communication control module 22 of the second housing 20 may include a light source control unit 22b that wirelessly controls the light source 11. In this case, the light source 11 is wirelessly controlled by the light source control unit 22b, and electric power can be supplied to the light source 11 via the connectors 42a and 42b by the second battery 23. With this configuration in which the first communication control module 12 is not included in the first housing 10, it is possible to simplify the configuration. For convenience of explanation, the present modification is described as a modification of the first embodiment in FIG. 17. The present modification, however, is also applicable as modifications of the second, third, fourth, and fifth embodiments as well.

Figure 18:
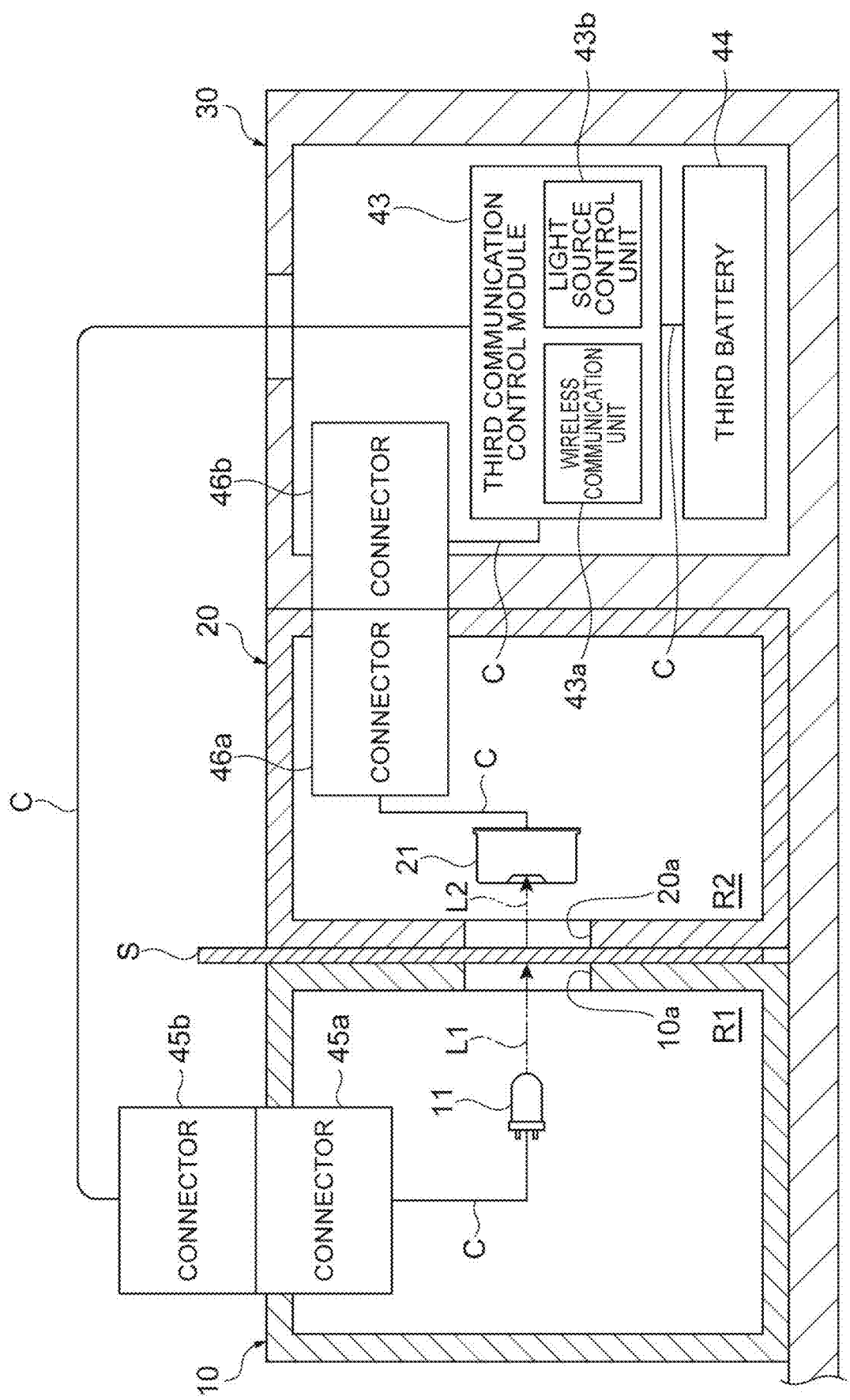
FIG. 18 is a configuration diagram illustrating a spectroscopic measurement device according to a modification.

As illustrated in FIG. 18, the above embodiment may have the following configuration. That is, the first housing 10 has a connector 45a with no first communication control module 12 nor the first battery 13. The second housing 20 has a connector 46a with no second communication control module 22 nor the second battery 23. The attachment 30 has a third communication control module 43, a third battery 44, a connector 45b for connecting to the connector 45a, and a connector 46b for connecting to the connector 46a. The third communication control module 43 functionally includes a wireless communication unit (measurement result transmission unit, control signal reception unit) 43a, and a light source control unit 43b. The wireless communication unit 43a receives a control signal for controlling the light source 11 from the outside by wireless communication. The wireless communication unit 43a transmits a signal related to the measurement result of the spectrometer 21 to the outside by wireless communication. The light source control unit 43b performs control (ON/OFF control, etc.) of the light source 11 on the basis of the control signal received by the wireless communication unit 43a. The third battery 44 supplies electric power to the light source 11, the spectrometer 21, and the third communication control module 43. The third battery 44 supplies electric power to the light source 11 via the connectors 45a and 45b. The third battery 44 supplies electric power to the spectrometer 21 via the connectors 46a and 46b. With such a configuration, the first housing 10 and the attachment 30 are connected via the cable C alone and the second housing 20 and the attachment 30 are directly connected, making it possible to easily slide the first housing 10 with respect to the second housing 20. For convenience of explanation, the present modification is described as a modification of the first embodiment in FIG. 18. The present modification, however, is also applicable as modifications of the second, third, fourth, and fifth embodiments as well.

Figure 19:
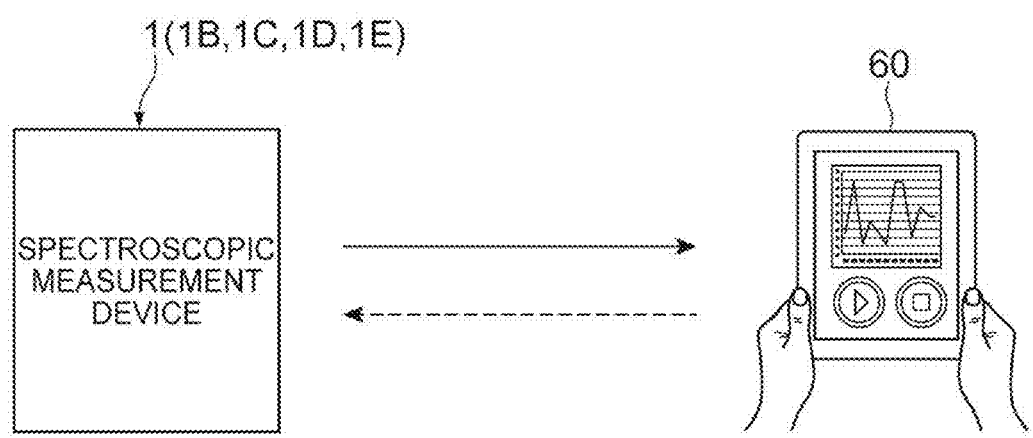
FIG. 19 is a configuration diagram illustrating a spectroscopic measurement device according to a modification.

As illustrated in FIG. 19, in the above embodiment, the spectroscopic measurement device 1 and the mobile information terminal 60 may be configured to be capable of directly communicating without going through a network. In this case, the measurement result of the spectrometer 21 of the spectroscopic measurement device 1 may be directly transmitted wirelessly from the wireless communication unit 22a to the mobile information terminal 60, and then, the measurement result may be processed by the mobile information terminal 60, and the processing result may be displayed on the interface of the mobile information terminal 60. Additionally, in this case, a control signal to control the light source 11 may be directly transmitted from the mobile information terminal 60 to the wireless communication unit 22a by radio. Here, the mobile information terminal 60 functions as a control terminal and a measurement result processing device.

In the above embodiment, a rubber layer may be provided on a surface of the outer surface of the first housing 10 on which the first opening 10a is formed. Similarly, a rubber layer may be provided on the surface of the outer surface of the second housing 20 on which the second opening 20a is formed. This can enhance the light shielding property. In addition, since the first housing 10 and the second housing 20 can be abutted against the measurement target S via the rubber layer, the first housing 10 and the second housing 20 can be firmly pressed against the measurement target S, making it possible to strongly hold the measurement target S.

In the first to fourth embodiments described above, the transmitted light measurement or the reflected light measurement can be replaced by the fluorescence measurement of measuring the fluorescence generated in the measurement target S as the measurement light L2. Specifically, fluorescence measurement may be performed in place of transmitted light measurement in a case where the relative positions of the light source 11 and the spectrometer 21 are such that the optical axis of the light L1 and the optical axis of the measurement light L2 are coaxial. Fluorescence measurement may be performed in place of reflected light measurement in a case where the relative positions of the light source 11 and the spectrometer 21 are such that the optical axis of the light L1 and the optical axis of the measurement light L2 intersect at a predetermined angle.

The spectroscopic measurement device or the spectrometry system according to the above embodiment may include a plurality of types of attachments (for example, all or a part of the attachments 30 to 34). In this case, one of the plurality of types of attachments is selected in accordance with the desired relative positions of the light source 11 and the spectrometer 21 as a desired arrangement in the spectrometry. Spectrometry is performed by using the selected attachment Note that one aspect of the present invention can also be regarded as a spectrometric method of performing spectrometry using the spectroscopic measurement device or the spectrometry system according to the above embodiment.

INDUSTRIAL APPLICABILITY

The technology makes it possible to provide a spectroscopic measurement device capable of disposing the light source and the spectrometer at desired relative positions and downsizing the device, and a spectrometry system including the spectroscopic measurement device.

REFERENCE SIGNS LIST 1, 1B, 1C, 1D, 1E Spectroscopic measurement device
10 First housing
10a First opening
11 Light source
12a Wireless communication unit (control signal reception unit)
12b, 22b, 43b Light source control unit
20 Second housing
20a Second opening
21 Spectrometer
22a, 43a Wireless communication unit (measurement result transmission unit, control signal reception unit)
30, 31, 32, 33, 34 Attachment
32f, 33g, 34g Position regulator
33h, 34h First optical path
33i, 34i Second optical path
50 Data processing server (measurement result processing device)
60 Mobile information terminal (control terminal, measurement result processing device)
100 Spectrometry system
S Measurement target
S1 Cuvette (container)
L1 Light
L2 Measurement light

The invention claimed is:

1. A spectroscopic measurement device configured to emit light to a measurement target to measure measurement light output from the measurement target corresponding to the light emission, the device comprising:
a first housing having a light shielding property and configured to house a light source that emits light and having a first opening through which the light emitted from the light source passes;
a second housing having a light shielding property and having a second opening through which the measurement light passes and configured to house a spectrometer that receives the measurement light that has passed through the second opening; and
an attachment configured to detachably hold the first housing and the second housing,
wherein the attachment slidably holds either one of the first housing and the second housing with respect to the other in a direction to allow the first opening and the second opening to come closer to or away from each other.

2. The spectroscopic measurement device according to claim 1,
wherein the attachment has a light shielding property, and the attachment internally includes: a first optical path being an optical path of the light emitted onto the measurement target and is continuous with the first opening; and a second optical path being an optical path of the measurement light output from the measurement target and is continuous with the second opening.

3. The spectroscopic measurement device according to claim 2, wherein the attachment holds the first housing and the second housing such that the first opening and the second opening face each other.

4. The spectroscopic measurement device according to claim 2,
wherein the attachment holds the first housing and the second housing such that an optical axis of the light to be emitted onto the measurement target and an optical axis of the measurement light output from the measurement target intersect at a predetermined angle.

5. The spectroscopic measurement device according to claim 2,
wherein the attachment has a position regulator configured to regulate a position of the measurement target or a container accommodating the measurement target.

6. The spectroscopic measurement device according to claim 1, wherein the attachment holds the first housing and the second housing such that the first opening and the second opening face each other.

7. The spectroscopic measurement device according to claim 6,
wherein the attachment holds the first housing and the second housing such that an optical axis of the light to be emitted onto the measurement target and an optical axis of the measurement light output from the measurement target intersect at a predetermined angle.

8. The spectroscopic measurement device according to claim 6,
wherein the attachment has a position regulator configured to regulate a position of the measurement target or a container accommodating the measurement target.

9. The spectroscopic measurement device according to claim 1,
wherein the attachment holds the first housing and the second housing such that an optical axis of the light to be emitted onto the measurement target and an optical axis of the measurement light output from the measurement target intersect at a predetermined angle.

10. The spectroscopic measurement device according to claim 9,
wherein the attachment has a position regulator configured to regulate a position of the measurement target or a container accommodating the measurement target.

11. The spectroscopic measurement device according to claim 1,
wherein the attachment has a position regulator configured to regulate a position of the measurement target or a container accommodating the measurement target.

12. A spectrometry system comprising:
the spectroscopic measurement device according to claim 1;
a measurement result transmitter provided in the spectroscopic measurement device and configured to transmit a measurement result of the spectrometer; and
a measurement result processor configured to receive the measurement result of the spectrometer from the measurement result transmission unit directly or through a network and perform processing of the measurement result.

13. The spectrometry system according to claim 12, further comprising:

a control terminal configured to generate a control signal for controlling the light source in accordance with operation of an operator and transmit the control signal;

a control signal receiver being provided in the spectroscopic measurement device and configured to receive the control signal from the control terminal directly or through a network; and a light source controller provided in the spectroscopic measurement device and configured to control the light source on the basis of the control signal received by the control signal reception unit.

14. The spectroscopic measurement device according to claim 1, wherein the attachment has an elongated rectangular flat plate shape.

15. The spectroscopic measurement device according to claim 1, wherein the attachment has a main body with an elongated rectangular flat plate shape and a holding part configured to detachably hold the first and second housings with respect to the main body.

* * * * *